(12) United States Patent
Huh et al.

(10) Patent No.: US 10,360,819 B2
(45) Date of Patent: Jul. 23, 2019

(54) METHODS AND DEVICES FOR MODELING THE EYE

(71) Applicant: THE TRUSTEES OF THE UNIVERSITY OF PENNSYLVANIA, Philadelphia, PA (US)

(72) Inventors: Dongeun Huh, Villanova, PA (US); Jeongyun Seo, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 236 days.

(21) Appl. No.: 15/495,619

(22) Filed: Apr. 24, 2017

(65) Prior Publication Data
US 2017/0229043 A1    Aug. 10, 2017

Related U.S. Application Data

(63) Continuation of application No. PCT/US2015/057202, filed on Oct. 23, 2015.

(60) Provisional application No. 62/068,494, filed on Oct. 24, 2014.

(51) Int. Cl.
G09B 23/28    (2006.01)
G09B 23/32    (2006.01)

(52) U.S. Cl.
CPC .................. G09B 23/32 (2013.01)

(58) Field of Classification Search
USPC .................. 434/262, 267, 270, 271
See application file for complete search history.

(56) References Cited

U.S. PATENT DOCUMENTS

| 5,137,459 A * | 8/1992 | Zirm ............ G09B 23/28 434/270 |
| 5,827,641 A | 10/1998 | Parenteau et al. |
| 6,552,103 B1 | 4/2003 | Bertozzi et al. |
| 7,507,092 B2 | 3/2009 | Sakezles |
| 8,157,568 B2 * | 4/2012 | Hara ............ G09B 23/34 434/262 |
| 8,684,743 B2 | 4/2014 | Van Dalen et al. |
| 2012/0231432 A1 | 9/2012 | Van Dalen et al. |
| 2012/0315699 A1 | 12/2012 | Hasirci et al. |

(Continued)

FOREIGN PATENT DOCUMENTS

| CN | 202 822 766 U | 3/2013 |
| WO | WO 2014/059533 A1 | 4/2014 |

OTHER PUBLICATIONS

Doane, "Interaction Of Eyelids And Tears In Corneal Wetting And The Dynamics Of The Normal Human Eyeblink," Am. J. Ophthalmol., 89:507-516 (1980).

(Continued)

Primary Examiner — Kurt Fernstrom
(74) Attorney, Agent, or Firm — Baker Botts L.L.P.

(57) ABSTRACT

The presently disclosed subject provides a biomimetic eye model, and methods of its production and use. In one exemplary embodiment, the biomimetic eye model can include a scaffold having a convex curvature, a fluidic device coupled to the scaffold, a fabricated eyelid coupled to the fluidic device and a motor coupled to the fabricated eyelid. In certain embodiments, the scaffold can be impregnated with one or more keratocytes and a surface of the convex curvature of the scaffold can be covered with one or more layers of epithelial cells.

8 Claims, 38 Drawing Sheets

(56) References Cited

U.S. PATENT DOCUMENTS

| | | | |
|---|---|---|---|
| 2014/0127663 A1 | 5/2014 | Eggert et al. | |
| 2015/0024364 A1* | 1/2015 | Lee | G09B 23/32 434/271 |
| 2016/0063898 A1* | 3/2016 | Bernal | G09B 23/32 434/271 |
| 2016/0098944 A1* | 4/2016 | Lin | G09B 23/32 434/271 |
| 2016/0189570 A1* | 6/2016 | Dong | G09B 23/286 434/271 |

OTHER PUBLICATIONS

Gulrez et al., "Hydrogels: Methods of Preparation, Characterisation and Applications," in Progress in Molecular and Environmental Bioengineering—From Analysis and Modeling to Technology Application, Chapter 5, pp. 117-150 (2011).
Huh et al., "From Three-Dimensional Cell Culture to Organs-on-Chips," Trends Cell Biol. 21(12):745-754 (2011).
International Search Report dated Jan. 19, 2016 in International Application No. PCT/US15/57202.
O'Brien, "Biomaterials & scaffolds for tissue engineering," Materials Today 14(3):88-95 (2011).
Pratchyapruit et al., "Functional analyses of the eyelid skin constituting the most soft and smooth area on the face: contribution of its remarkably large superficial corneocytes to effective water-holding capacity of the stratum corneum," Skin Research and Technology, 13:169-175 (2007).
Ratner et al., "Biomaterials: Where We Have Been and Where We Are Going?", Annual Review of Biomedical Eng. 6:41-75 (2004).
Supplementary European Search Report dated Feb. 26, 2018 in Application No. EP 15852015.

* cited by examiner

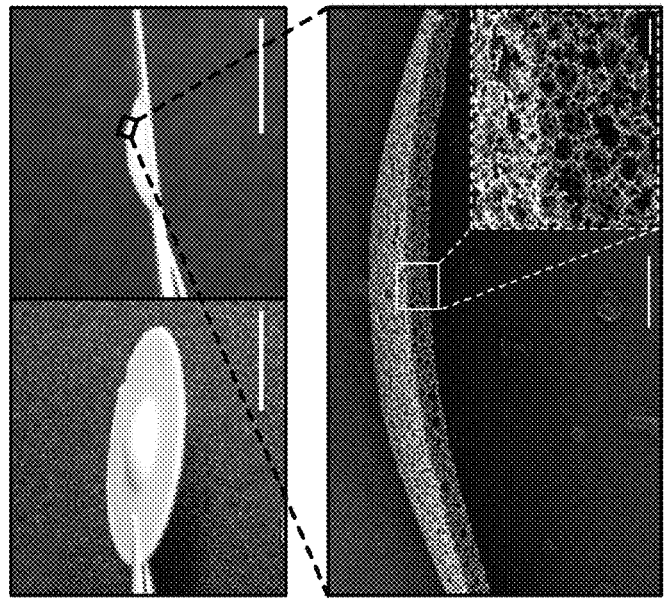
FIG. 3B
FIG. 3C
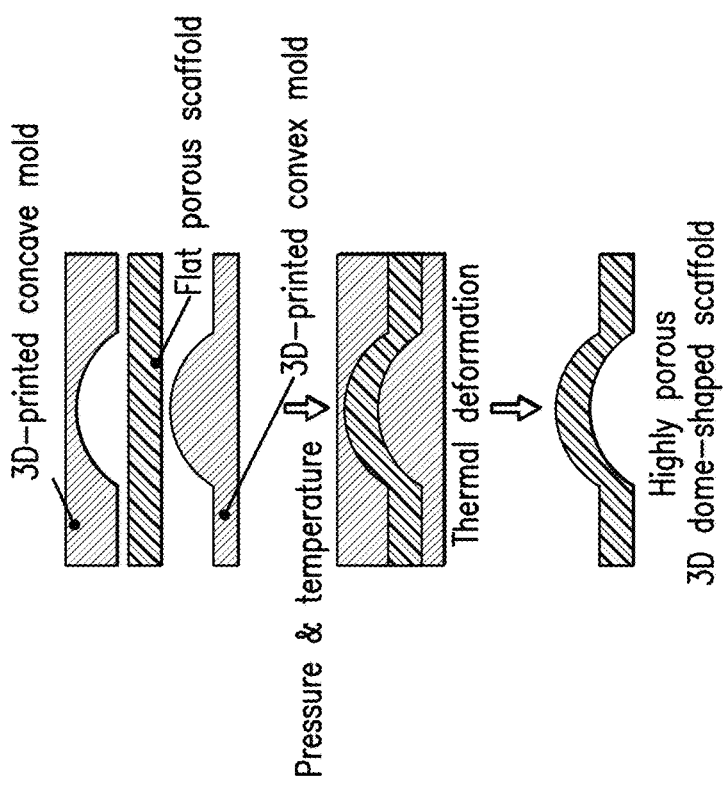
FIG. 3A

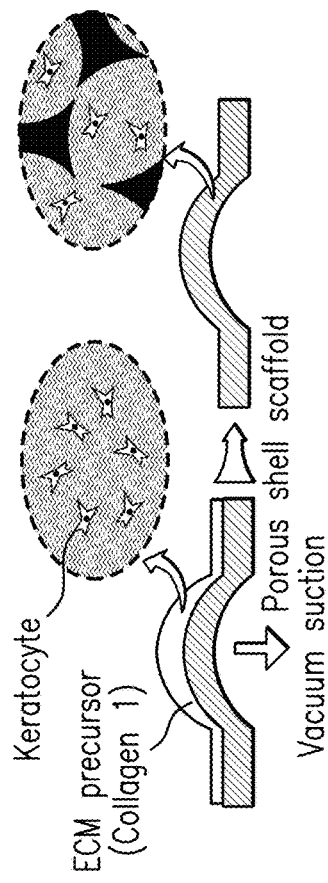
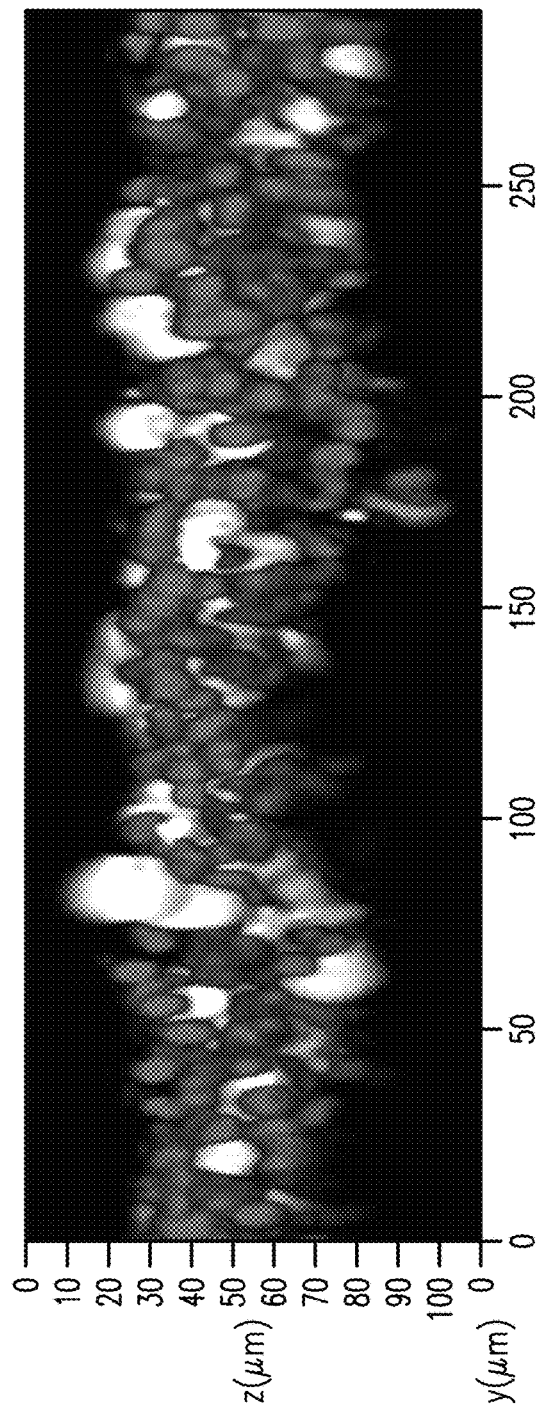
FIG. 5A
FIG. 5B

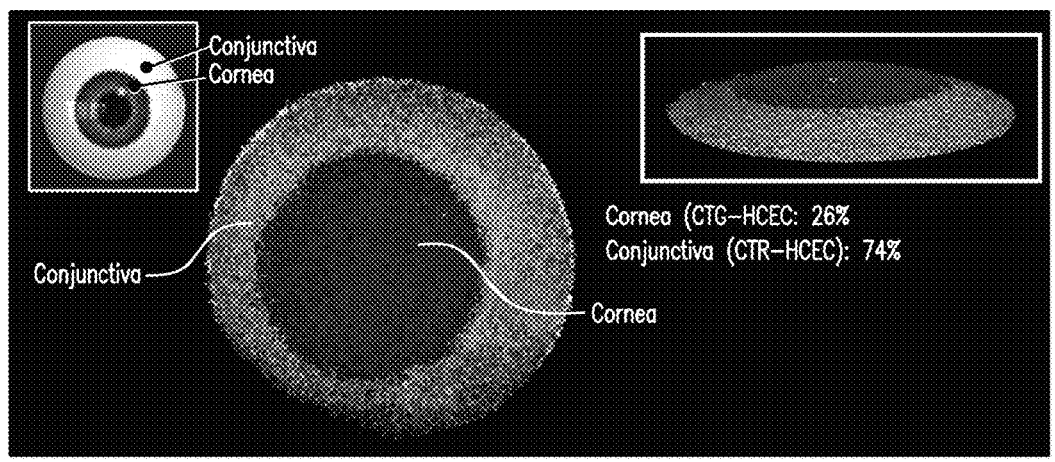
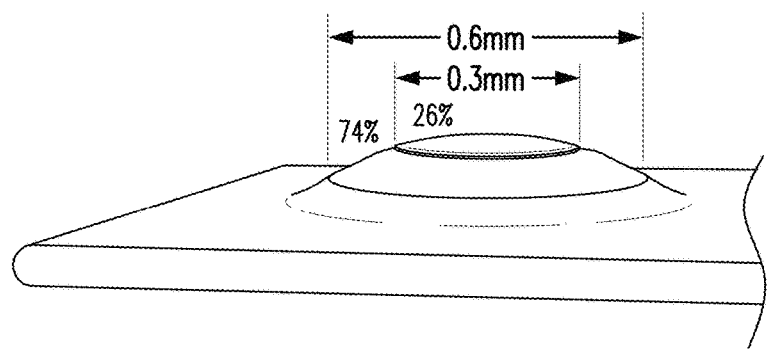
FIG. 7A

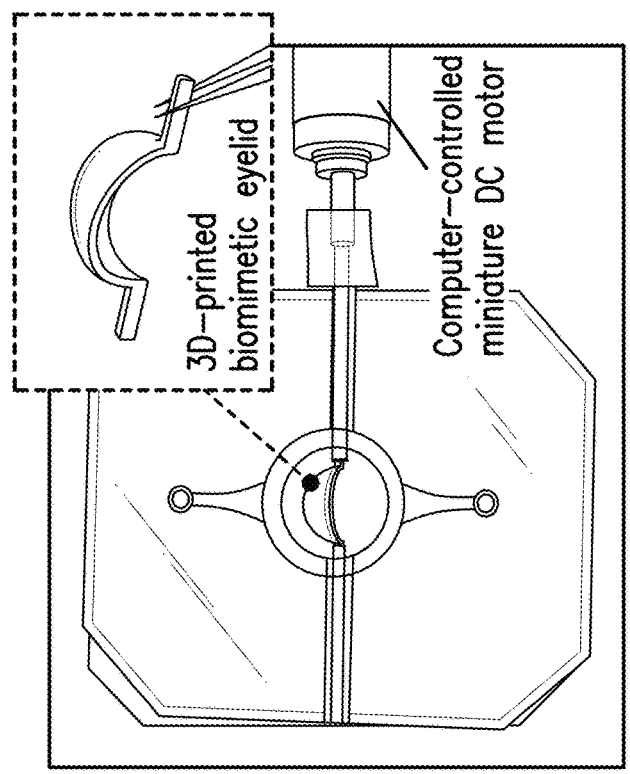
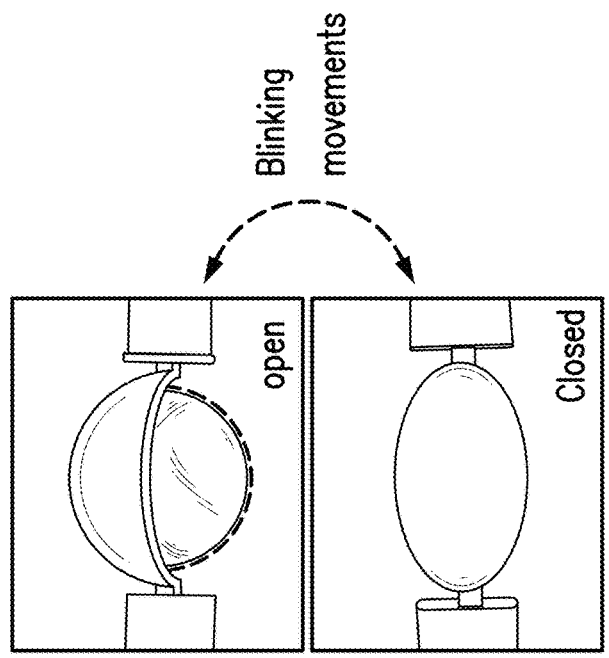
FIG. 8A
FIG. 8B

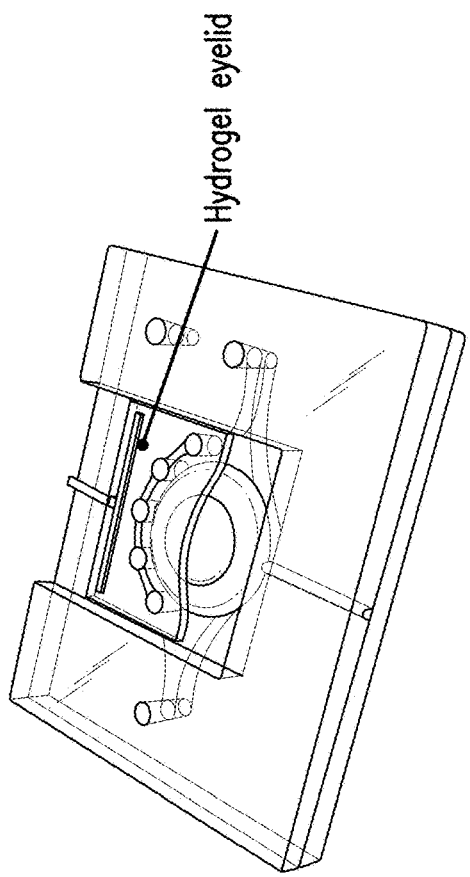
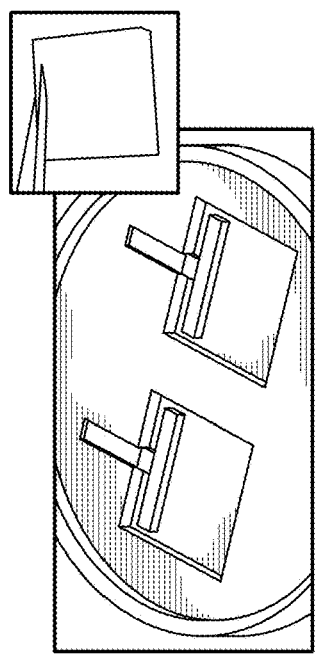
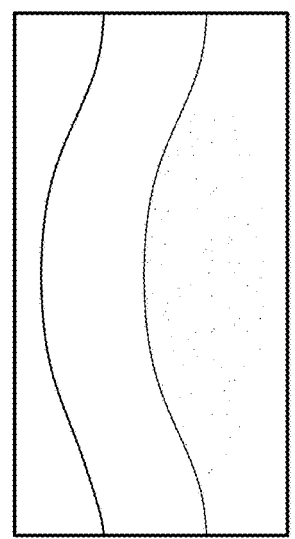
FIG. 10C
FIG. 10A
FIG. 10B

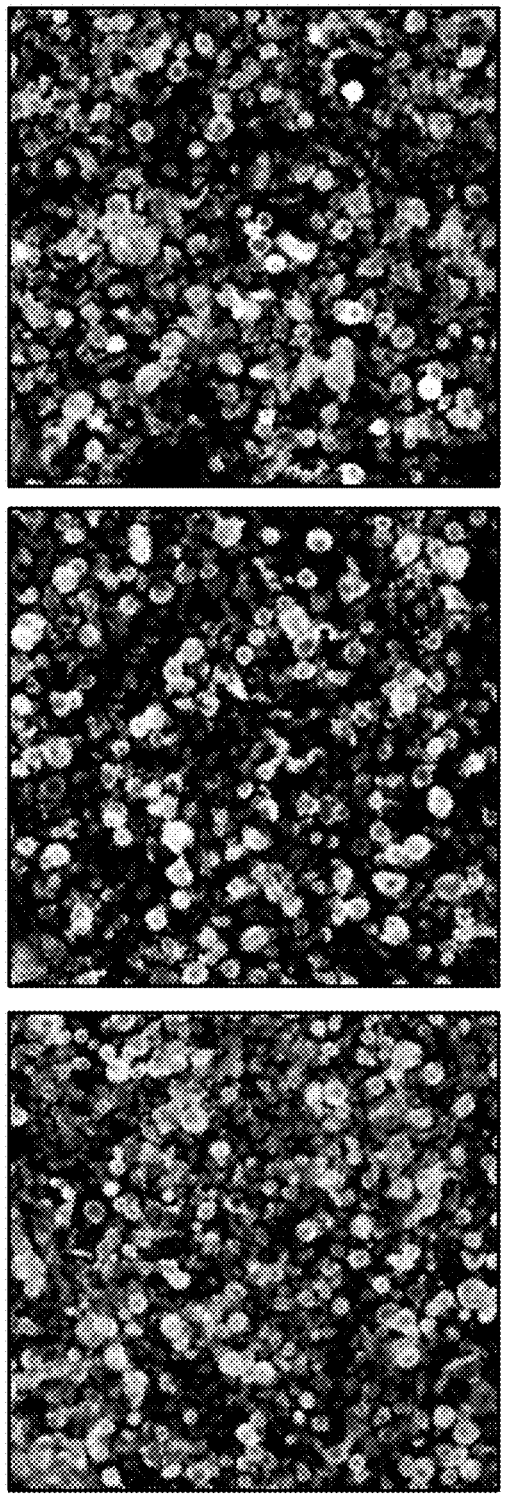

FIG. 24A
FIG. 24B
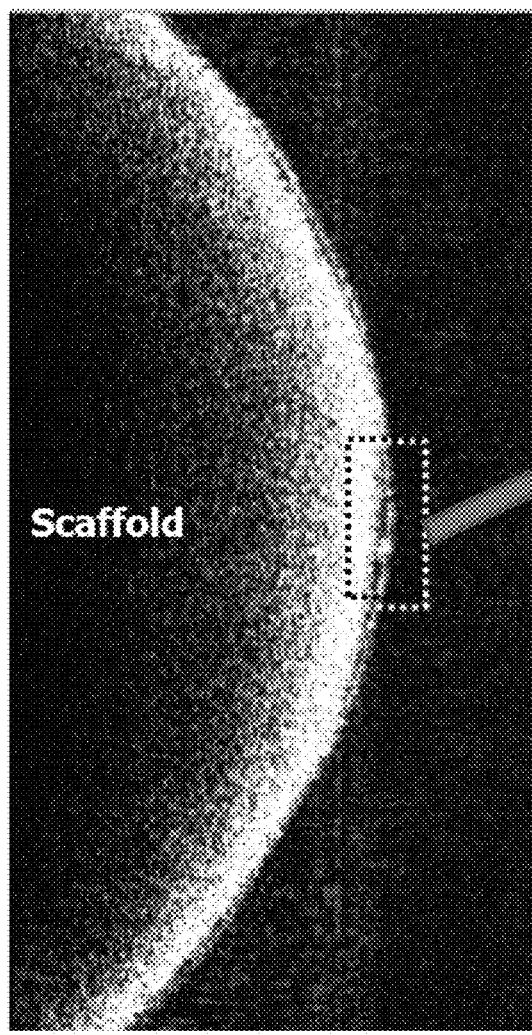
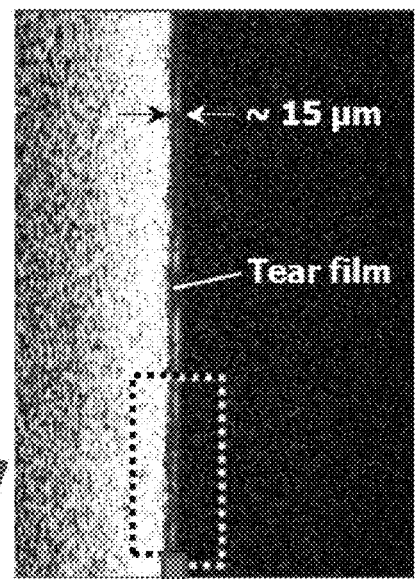
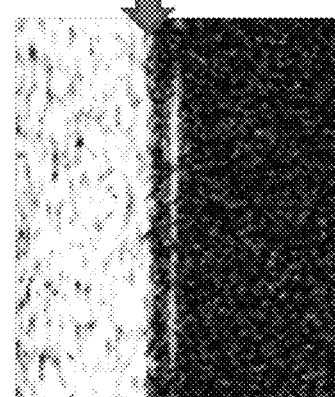
FIG. 24C

METHODS AND DEVICES FOR MODELING THE EYE

CROSS-REFERENCE TO RELATED APPLICATIONS

This application is a continuation of International Application No. PCT/US2015/057202, filed Oct. 23, 2015, which claims priority to U.S. Provisional Application No. 62/068,494, filed Oct. 24, 2014, the contents of each of which are hereby incorporated by reference in their entireties and priority to each of which is claimed.

BACKGROUND

The ocular surface is an anatomical and functional unit of the eye that protects the ocular system from external environments and provides a smooth refractive surface for light transmission. As a protective barrier in this unit, the cornea includes closely apposed epithelium and endothelium separated by a collagen-rich stromal tissue that contains keratocytes. At the circumferential margin of the cornea, the corneal epithelium grades into the conjunctiva lined with goblet cells that are responsible for producing the mucus component of the tear fluid. The ocular surface is under the constant influence of a dynamic microenvironment created by spontaneous eye blinking-induced eyelid movements and concomitant spreading of the tear film that permits hydration and lubrication of the cornea and conjunctiva.

The structural, functional and environmental complexity of the ocular surface poses certain technical challenges for in vitro investigation of its physiology and pathology using traditional cell culture models. As a result, certain research in this area has relied on expensive and time-consuming ex vivo or in vivo animal studies that can often fail to model biological responses in humans. These drawbacks of existing models can limit the understanding and the development of new therapeutic approaches to ocular diseases.

One approach to meeting these challenges is to leverage microengineering technologies that provide unprecedented capabilities to control cellular microenvironment with high spatiotemporal precision and to present living cultured cells with mechanical and biochemical signals in a more physiologically relevant context. This has led to the development of microengineered biomimetic systems such as "organs-on-chips" that simulate complex organ-level physiology. This strategy can assist in developing specialized in vitro human disease models that enable reconstitution and quantitative analysis of various biological responses to abnormal microenvironmental signals for ocular disease studies.

Certain in vitro eye models largely fail to fully recapitulate the structural and functional complexity of their in vivo counterparts, and thus have had little to no success in gaining widespread use for practical applications. As a result, current preclinical or non-human testing strategies rely predominantly on time-consuming and costly animal studies using tissue explants or whole animals.

SUMMARY

The presently disclosed subject matter provides a biomimetic eye model and methods of its use. The present disclosure also provides for methods of fabricating the biomimetic eye model. In an exemplary non-limiting embodiment, the biomimetic eye model can include a scaffold having a convex curvature, a fluidic device coupled to the scaffold and a fabricated eyelid coupled to the fluidic device. In certain embodiments, the scaffold can include polymers, e.g., polystyrene, polytheylene glycol, polyurethane, polycarbonate, polyvinyl alcohol, nylon, polylactic acid, polymethacrylate and/or polyethylene oxide. In certain embodiments, the scaffold is a porous material that has one or more pores with a diameter from about 10 nm to about 1 mm. In certain embodiments, the convex curvature of the scaffold has a radius from about 100 µm to about 100 cm. In certain embodiments, the convex curvature of the scaffold replicates the curvature of a native eye in a healthy state and/or in a diseased state. In certain embodiments, the curvature of the scaffold varies in space. In certain embodiments, the curvature of the scaffold varies in time. In certain embodiments, the scaffold includes a hydrogel composition. In certain embodiments, the scaffold includes extracellular matrix (ECM) derived from decellularized organs, e.g., decellularized ECM.

In certain embodiments, the scaffold is impregnated with one or more keratocytes and other types of cells found in ocular tissue. In certain embodiments, a surface of the convex curvature of the scaffold is covered with one or more layers of epithelial cells. In certain embodiments, the one or more layers of epithelial cells include a layer of corneal epithelial cells and a layer of conjunctival cells in a concentric circular pattern. In certain embodiments, a surface of the concave curvature of the scaffold is covered with one or more layers of endothelial cells.

In certain embodiments, the fabricated eyelid includes a hydrogel composition. In certain embodiments, the fabricated eyelid includes chemicals and drug compounds. In certain embodiments, the fabricated eyelid can include and/or be composed of a chemically responsive material. In certain embodiments, the fabricated eyelid can include and/or be composed of an electrically responsive material. In certain embodiments, the fabricated eyelid includes magnetic materials. In certain embodiments, the fabricated eyelid includes elastomers, polymers, plastics, metals, ceramics and/or paper.

In certain embodiments, the fluidic device includes one or more flow channels and one or more circular chambers. In certain embodiments, the fluidic device further includes one or more microfabricated openings and one or more tear secretion and tear drainage channels.

In certain embodiments, the biomimetic eye model can further include a motor coupled to the fabricated eyelid. In certain embodiments, the biomimetic eye model can further include a computer coupled to the motor for controlling motor speed and/or the direction of motion. In certain embodiments, the biomimetic eye model can further include an electromagnet coupled to the fabricated eyelid containing magnetic materials. In certain embodiments, the biomimetic eye model can further include a computer coupled to the electromagnet for controlling strength and distribution of magnetic field. In certain embodiments, the biomimetic eye model, e.g., the fluidic device, can further include one or more fluidic channels to deliver chemicals to a fabricated eyelid composed of a chemically responsive material. In certain embodiments, the biomimetic eye model can further include one or more electrodes to apply electric potential to a fabricated eyelid composed of a electrically responsive material.

The presently disclosed subject matter further provides methods for producing a biomimetic eye model. In certain embodiments, the method can include generating a planar scaffold. In certain embodiments, the method can include generating a convex curvature on a scaffold, e.g., on a planar scaffold. In certain embodiments, a convex curvature on the scaffold can be produced by thermal deformation of a planar scaffold between a convex mold and a concave mold. In certain embodiments, a convex curvature on the scaffold can be produced by replica molding of a convex mold. In certain embodiments, a convex curvature on the scaffold can be produced by electro-spinning of polymeric materials on a convex mold. In certain embodiments, a convex curvature on the scaffold can be produced by inflating a stretchable planar membrane using hydraulic or pneumatic pressure. In certain embodiments, a convex curvature on the scaffold can be produced by decellularizing a native ocular tissue. In certain embodiments, a convex curvature on the scaffold can be produced by three-dimensionally printing polymers into desired shapes. In certain embodiments, a convex curvature on the scaffold can be produced by illuminating photocurable polymer resins with light to generate three-dimensional structures.

In certain embodiments, the method can further include coupling the scaffold to a fluidic device.

In certain embodiments, the method for producing a biomimetic eye model can further include impregnating the scaffold with one or more keratocytes and other types of cells derived from ocular tissue. In certain embodiments, the method can further include impregnating the scaffold with one or more chemicals and/or drug compounds. In certain embodiments, the method can further include impregnating the scaffold with one or more engineered materials, including therapeutic micro/nanoparticles, drug releasing micro/nanoparticles, chemical releasing micro/nanoparticles and/or imaging probes.

In certain embodiments, the method for impregnating the scaffold with cells can include depositing a cell suspension containing one or more cells and an extracellular matrix (ECM) to the convex or concave curvature of a scaffold having one or more pores and applying suction to the opposite surface of the scaffold to facilitate entry of the one or more cells into the one or more pores of the scaffold. For example, and not by way of limitation, a cell suspension can be deposited onto the convex curvature of the scaffold and suction can be applied to the concave surface of the scaffold, e.g., to facilitate entry of the cells into the pores of the scaffold. The method can further include solidifying the ECM to result in the filling of the pores of the scaffold with one or more cells. In certain embodiments, the ECM can include a hydrogel composition.

In certain embodiments, the method for impregnating the scaffold with cells can include introducing cells to the convex or concave curvature of a scaffold and inducing them to migrate into a scaffold filled with an ECM, e.g., an ECM hydrogel, by generating concentration gradients of cell-attracting chemicals (e.g., chemoattractants) across the scaffold. In certain embodiments, the method can include introducing cells to the convex or concave curvature of a scaffold and inducing them to migrate into a scaffold filled with an ECM hydrogel by generating gradients of hydrogel stiffness across the scaffold. In certain embodiments, the method can include introducing cells to the convex or concave curvature of a scaffold and inducing them to migrate into a scaffold filled with an ECM, e.g., an ECM hydrogel, by generating concentration gradients of gases across the scaffold.

In certain embodiments, the method for impregnating the scaffold with chemicals and/or drug compounds can include depositing a solution containing one or more chemicals and/or drug compounds and an ECM to the convex or concave curvature of a scaffold having one more pores and applying suction to the opposite surface of the scaffold to facilitate entry of the one or more chemicals and/or drug compounds into the one or more pores of the scaffold. The method can further include solidifying the ECM to result in the filling of the pores of the scaffold with the one or more chemicals and/or drug compounds and the ECM. In certain embodiments, the ECM can include a hydrogel composition.

In certain embodiments, the method for impregnating the scaffold with engineered materials can include depositing a solution containing one or more engineered materials and an ECM to the convex or concave curvature of a scaffold having one more pores and applying suction to the opposite surface of the scaffold to facilitate entry of chemicals into the one or more pores of the scaffold. The method can further include solidifying the ECM to result in the filling of the pores of the scaffold with the one or more engineering materials and the ECM. In certain embodiments, the ECM can include a hydrogel composition.

In certain embodiments, the method can further include adhering corneal and conjunctival epithelial cells to a surface of the convex curvature of the scaffold. In certain embodiments, the method for adhering corneal and conjunctival epithelial cells on a surface of the convex curvature of the scaffold can include depositing a first cell suspension containing one or more corneal epithelial cells into a first concave well, and compressing the first cell suspension in the first concave well with the convex curvature of the scaffold to form a circular pattern of adhered corneal epithelial cells on the scaffold. In certain embodiments, the method can further include depositing a second cell suspension containing one or more conjunctival epithelial cells into a second concave well, and compressing the second cell suspension in the second concave well with the convex curvature of the scaffold with the adhered corneal epithelial cells to form a circular pattern of adhered conjunctival epithelial cells surrounding the adhered corneal epithelial cells.

The presently disclosed subject matter further provides methods for producing a biomimetic eye model. In certain embodiments, the method can include providing a scaffold including a surface. In certain embodiments, the method can include coupling the scaffold to a fluidic device. In certain embodiments, the method can include impregnating the scaffold with one or more keratocytes. In certain embodiments, the method can include adhering corneal and conjunctival epithelial cells to the surface.

In certain embodiments, the surface can include a circular pattern of adhered conjunctival epithelial cells surrounding the adhered corneal epithelial cells after adhering the corneal and conjunctival epithelial cells to the surface.

In certain embodiments, the surface can include a convex curvature of the scaffold.

In certain embodiments, the method can further include coupling a fabricated eyelid to the fluidic device.

In certain embodiments, impregnating the scaffold with keratocytes can include depositing a cell suspension including one or more keratocytes and an extracellular matrix (ECM) to the convex curvature of the scaffold.

In certain embodiments, the ECM includes a hydrogel.

In certain embodiments, the adhesion of corneal and conjunctival epithelial cells is to the convex curvature of the scaffold.

In certain embodiments, the method can further include coupling a motor to the fabricated eyelid.

The presently disclosed subject matter further provides methods of using the disclosed biomimetic eye model. In certain embodiments, the biomimetic eye model can be used to simulate, visualize and analyze biological and physiological processes that play a critical role in the maintenance of normal structure and function of the ocular surface. Non-limiting examples of such processes include differentiation of epithelial cells, recruitment of stem cells, function of resident immune cells, maintenance of immune cells, maintenance of keratocytes, angiogenesis in the conjunctiva, innervation of the ocular tissue, replenishment of the cornea and conjunctiva, dynamics of the tear film, interaction of the tear film with epithelial cells and the interaction between tear fluid proteins. In certain embodiments, the biomimetic eye model can be used to recapitulate abnormal changes in the structure, function and environment of the ocular surface during the development and progression of ocular diseases including, but not limited to, dry eye syndrome, increased evaporation of tear film, reduced production of tear fluid, alterations in the composition of tear fluid, alterations in the rate of eye blinking, alterations in the size, number and volume of epithelial cells, alterations in the curvature of the ocular surface, exposure to inflammatory cytokines and pathogens (e.g., bacteria, viruses), recruitment of immune cells, activation of keratocytes and other stromal cells in the cornea and conjunctiva and fibrosis of the stroma.

In certain embodiments, the biomimetic eye model can be used for identifying pharmaceutical compositions that alleviate disease processes, e.g., dry eye syndrome. In certain embodiments, the biomimetic eye model can be used for testing artificial tear fluids. In certain embodiments, the biomimetic eye model can be used for identifying compositions (such as, but not limited to, chemicals, environmental toxins, particulates, cosmetics, etc.) harmful to the ocular surface. In certain embodiments, the biomimetic eye model can be used for designing and evaluating the performance of contact lenses and medical implants. In certain embodiments, the biomimetic eye model can be used for testing surgical and intervention devices in ophthalmology. In certain embodiments, the biomimetic eye model can be used for testing cell therapies.

BRIEF DESCRIPTION OF THE FIGURES

FIG. 3A-D. (A) Microengineering of a flat porous scaffold to produce a dome-shaped thin shell scaffold. (B) Three dimensional (3D) porous shell scaffolds with a curved shape to closely mimic the geometrical structure of the human ocular surface. Scale bars, 5 mm. (C) Scanning electron microscopy (SEM) images of the 3D shell scaffolds with interconnected pore networks. Scale bars, 500 μm and 50 μm (inset). (D) The placement of the flat porous scaffold within a fluidic device.

FIG. 5A-B. (A) Formation of a stromal layer by filling cavities with keratocytes and an ECM precursor solution. (B) Confocal image of the fluorescently labeled keratocytes (labeled with DAPI) within the porous scaffold.

FIG. 7A-B. (A) 3D patterning of green (corneal epithelial cells) and red cells (conjunctival epithelial cells) on the curved surface to recapitulate the human corneal and conjunctival tissues, respectively. (B) The histological structures of the epithelial layers.

FIG. 8A-B. (A) Integration of a cell culture scaffold, a 3D-printed biomimetic eyelid and a miniature DC motor to form a complete eye-on-a-chip device. (B) Movements of the 3D-printed biomimetic eyelid over the curved surface to mimic human eye blinking.

FIG. 10A-C. Biomimetic hydrogel eyelids. (A) Fabrication of the hydrogel eyelid. (B) Highly compliant hydrogel eyelid over the shell scaffold. (C) Eye-on-a-chip device with a hydrogel eyelid.

FIG. 12A-C. Human corneal cells stimulated with blinking actuation of hydrogel eyelids. (A) Control. (B) After 30 times of blinking. (C) After 150 times of blinking.

FIG. 24A-C. High resolution OCT images of the tear film in the microengineered biomimetic eye-on-a-chip device.

DETAILED DESCRIPTION

Figure 1A:
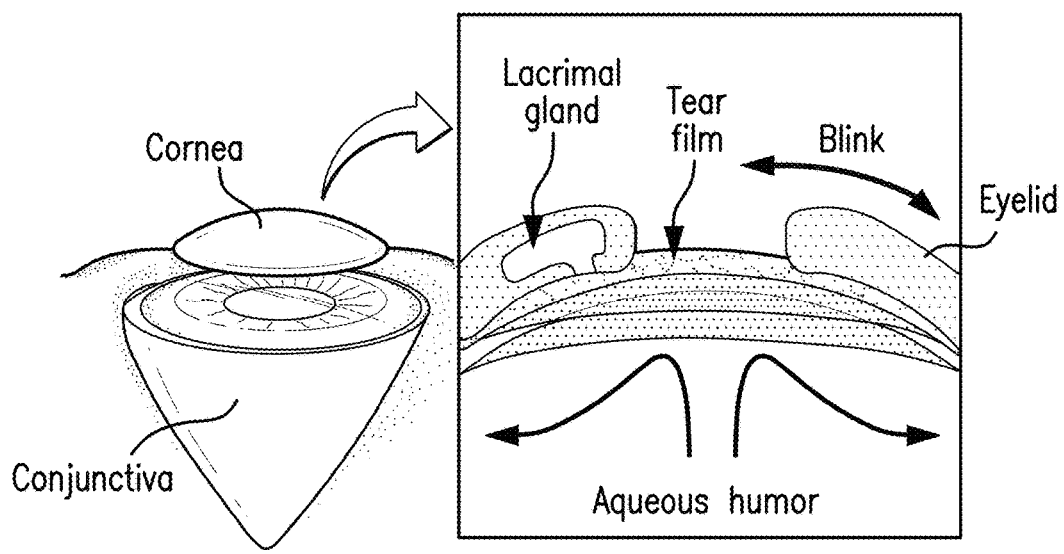
FIG. 1A-B. (A) The structure and microenvironment of the ocular surface in the human eye. (B) A microengineered biomimetic human eye model of the presently disclosed subject matter that recapitulates the multi-layered tissue structure, spontaneous eye blinking and tear film dynamics of the ocular surface.

The presently disclosed subject matter provides a biomimetic eye model and methods of its use. The present disclosure also provides for methods of fabricating the biomimetic eye model. The disclosed biomimetic eye model can provide an in vitro testing and investigation platform that replicates the three-dimensional (3D) architecture, differentiated physiological functionality and dynamic microenvironment of the human ocular surface.

Biomimetic Eye Model

The presently disclosed subject matter provides a biomimetic eye model. For the purpose of illustration and not limitation, FIG. 1 is a schematic representation of an exemplary eye model according to the disclosed subject matter. In certain embodiments, the biomimetic eye model 100 can include a scaffold 101. The scaffold 101 can include a deformable material that has a 3D curvature. In certain embodiments, the curvature of the scaffold varies in space. In certain embodiments, the curvature of the scaffold changes in time. "Deformable," as used herein, refers to a material that can be shaped by pressure, heat and/or stress. In certain embodiments, the scaffold 101 can be a natural or synthetic material.

In certain embodiments, the scaffold includes a hydrogel composition. For example, and not by way of limitation, the scaffold 101 can be composed of a hydrogel. Non-limiting examples of hydrogels include hydrogels containing extracellular matrix proteins such as collagen, fibronectin, fibrin, lamin and elastin, acrylamide-functionalized carbohydrate, citosan, glycosaminoglycans, sulfoxide, sulfide or sulfone copolymerized with hydrophilic or hydrophobic copolymerizing material, such as acrylamide, methacrylamide, acrylate, methacrylate or vinyl or their derivatives, such as 2-hydroxyethyl methacrylate. Additional non-limiting examples of hydrogels are disclosed in Gulrez and Al-Assaf, Progress in Molecular and Environmental Bioengineering—From Analysis and Modeling to Technology Application (2011), O'Brien, Materials Today Vol. 14(3):88-95 (2011), Ratner and Bryant, Annual Review of Biomedical Eng. Vol. 6:41-75 (2004) and in U.S. Pat. No. 6,552,103, the contents of which are hereby incorporated by reference in their entireties.

In certain embodiments, the scaffold 101 includes extracellular matrix (ECM) derived from decellularized organs. In certain embodiments, the scaffold 101 can be fabricated from ex vivo tissues isolated from humans and/or animals such as amniotic membranes or decellularized organs.

In certain embodiments, the scaffold 101 can be fabricated in plastics, elastomers, metals, ceramics and/or paper. In certain embodiments, the scaffold 101 can be composed of a polymer. For example, and not by way of limitation, the scaffold 101 can be composed of polyesters, styrene-based polymers, e.g., polystyrene, polyetheylene glycol, polyurethane, polycarbonate, polyvinyl alcohol, nylon, polymethacrylate, polyethylene oxide, polyglycolic acid, polylactic acid, cellulose acetate, hydroxyapatite and/or polycaprolactone. In certain embodiments, the scaffold 101 is composed of polystyrene.

In certain embodiments, the scaffold 101 can be a porous material, e.g., polystyrene, where the pores of the material have a diameter of about 10 nm to about 1 mm. For example, and not by way of limitation, the one or more pores of the porous material can have a diameter from about 10 nm to about 750 µm, from about 10 nm to about 500 µm, from about 10 nm to about 400 µm, from about 10 nm to about 300 µm, from about 10 nm to about 200 µm, from about 10 nm to about 100 µm, from about 10 nm to about 90 µm, from about 10 nm to about 80 µm, from about 10 nm to about 70 µm, from about 10 nm to about 60 µm, from about 10 nm to about 50 µm, from about 10 nm to about 40 µm, from about 10 nm to about 30 µm, from about 10 nm to about 20 µm, from about 20 nm to about 500 µm, from about 30 nm to about 500 µm, from about 40 nm to about 500 µm, from about 50 nm to about 500 µm, from about 60 nm to about 500 µm, from about 70 nm to about 500 µm, from about 80 nm to about 500 µm, from about 90 nm to about 500 µm, from about 100 nm to about 500 µm, from about 200 nm to about 500 µm, from about 300 nm to about 500 µm or from about 400 nm to about 500 µm. In certain embodiments, the scaffold can include a complex network of pores with a diameter of about 40 µm.

In certain embodiments, the scaffold 101 can have a thickness from about 10 µm to about 1 mm. For example, and not by way of limitation, the scaffold 101 can have a thickness from about 10 µm to about 900 µm, from about 10 µm to about 800 µm, from about 10 µm to about 700 µm, from about 10 µm to about 600 µm, from about 10 µm to about 500 µm, from about 10 µm to about 400 µm, from about 10 µm to about 300 µm, from about 10 µm to about 200 µm, from about 10 µm to about 100 µm, from about 10 µm to about 50 µm, about 10 µm to about 1 mm, about 50 µm to about 1 mm, about 100 µm to about 1 mm, about 200 µm to about 1 mm, about 300 µm to about 1 mm, about 400 µm to about 1 mm, about 500 µm to about 1 mm, about 600 µm to about 1 mm, about 700 µm to about 1 mm, about 800 µm to about 1 mm or about 900 µm to about 1 mm. In certain embodiments, the scaffold can have a curvature that mimics the in vivo curvature of a native eye, e.g., a human eye, in health and/or disease. For example, and not by way of limitation, the radius of the curvature can be from about sub-millimeters, e.g., 1 µm, to about 100 centimeters. Alternatively, the scaffold 101 can have a curvature that mimics the curvature of an eye that has an astigmatism.

In certain embodiments, the biomimetic eye model 100 disclosed herein can include a fluidic device 102. The fluidic device 102 can be composed of any material that retains fluid. Non-limiting examples of such materials include polydimethylsiloxane (PDMS), polyurethane, silicon, quarts and glass, poly(methyl methacrylate) (PMMA), polyvinyl chloride, SU-8, cyclic-olefin-copolymer (COC), polycarbonate (PC), polyethylene (PE), polytetrafluoroethylene (PTFE), polyethylene terephthalate (PET), polyacrylate, polystyrene, cellulose acetate and ceramics. In certain embodiments, the fluidic device 102 can be composed of PDMS.

In certain embodiments, the scaffold 101 can be placed on and/or within the fluidic device 102. In certain embodiments, the fluidic device 102 can include an upper 109 and lower 108 portion, and at least one fluid channel 105, e.g., a main flow channel, and at least one circular chamber. For example, and not by way of limitation, the lower portion 108 of the fluidic device 102 can include one or more circular chambers and one or more flow channels 105 that are in fluid communication with each other to allow a continuous flow of fluid, e.g., culture media, through the channel which can supply nutrients and oxygen to a circular chamber. Alternatively or additionally, the upper portion of the fluidic device 102 can include a circular opening that can be positioned above the circular chamber and/or flow chamber. In certain embodiments, the fluid flowing through the channels can be cell culture media, physiological fluids such as aqueous humor, aqueous buffers, blood simulants, tear simulants, solutions containing immune cells, drugs, chemicals, toxins, particulates and inflammatory cytokines. In certain embodiments, the scaffold 101 can be positioned between the upper 109 and lower 108 portions of the fluidic device 102, where the curved surface of the scaffold 101 is positioned above the circular chamber of the lower portion of the fluidic device 102 and protrudes through the circular opening of the upper portion of the fluidic device, as described in FIGS. 1 and 4.

Figure 9B:
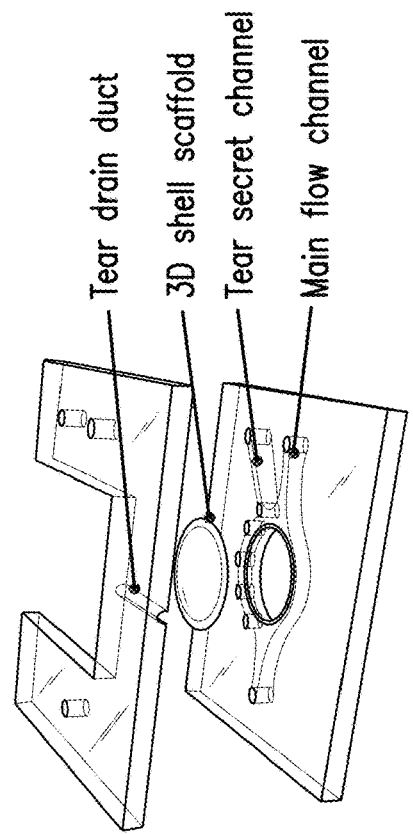
FIG. 9A-B. Fluidic channel design for recapitulation of tear fluid dynamics. (A) Top-down view. (B) Assembly of the upper chamber, the intervening 3D shell scaffold and the lower fluidic channel to generate an eye-on-a-chip device.
Figure 9A:
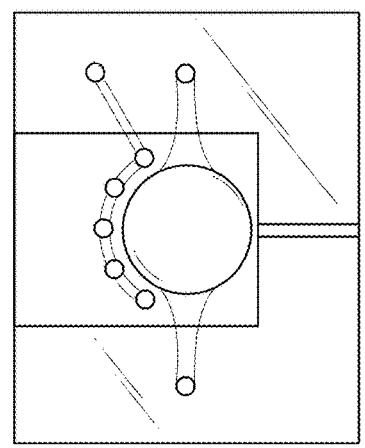

In certain embodiments, the fluidic device 102 can further include one or more microfabricated openings in fluid communication with one or more tear secretion channels. In certain embodiments, the one or more microfabricated openings and the one or more tear secretion channels can be present on the lower portion of the fluidic device 102. For example, and not by way of limitation, the fluidic device can have about one or more, about two or more, about three or more, about four or more, about five or more, about six or more, about seven or more, about eight or more, about nine or more or about ten or more microfabricated openings interconnected by one or more tear secretion channels. In certain embodiments, the fluidic device 102 includes one or more microfabricated openings in fluid communication with one secretion channel, as depicted in FIG. 9. In certain embodiments, the fluidic device 102 can further include one or more tear drain ducts. For example, and not by way of limitation, the fluidic device 102 can have one tear drain duct that can be present on the upper 109 portion of the fluidic device 102 as depicted in FIG. 9.

In certain embodiments, the biomimetic eye model 100 disclosed herein can include one or more cell types within one or more cell layers. Cells suitable for inclusion in the biomimetic eye model of the present disclosure can be derived from any suitable source. In certain embodiments, human primary corneal epithelial cells, human primary corneal endothelial cells, human primary keratocytes and human primary conjunctival cells can be obtained from commercial sources and used in the biomimetic eye model. In certain embodiments, human primary corneal epithelial cells, human primary keratocytes, human primary corneal endothelial cells and human primary conjunctival cells can be isolated from clinically obtained human ocular tissue specimens for use in the biomimetic eye model. In certain embodiments, human primary corneal epithelial cells, human primary keratocytes, human primary corneal endothelial cells and human primary conjunctival epithelial cells can be engineered to become immortal and used in the biomimetic eye model. In certain embodiments, immortalized human corneal epithelial cells, human corneal endothelial cells, human keratocytes and human conjunctival cells can be obtained from commercial sources and used in the biomimetic eye model. In certain embodiments, primary or immortalized murine, rat, bovine, porcine and primate cells can be used in the biomimetic eye model. In certain embodiments, the cells can be generated from stem cells derived from various sources that are then differentiated into the desired cell type. In certain embodiments, cells can be cultured for a period of time under various conditions to induce certain phenotypes before placing the cells within the eye model.

In certain embodiments, the cells can be manipulated to express an exogenous protein by the introduction of a nucleic acid that encodes the exogenous protein within the cells. For example, and not by way of limitation, the cells can express a fluorescent protein, e.g., GFP, RFP and the like. In certain embodiments, the introduction of a nucleic acid into a cell can be carried out by any method known in the art including, but not limited to, transfection, electroporation, microinjection, infection with a viral or bacteriophage vector containing the nucleic acid sequences, cell fusion, chromosome-mediated gene transfer, microcell-mediated gene transfer, spheroplast fusion, etc. In certain embodiments, patient-derived diseased cells can be obtained from clinical samples and used in the biomimetic eye system to model ocular diseases.

In certain embodiments, the biomimetic eye model 100 can include one or more cells positioned within the scaffold 101, e.g., within the pores of the scaffold. In certain embodiments, the use of cells within the scaffold 101 can mimic the stromal tissue of the cornea. For example, and not by way of limitation, the biomimetic eye model 100 can include the presence of keratocytes within the scaffold 101. In certain embodiments, the scaffold 101 can further include an ECM. The ECM can include, but is not limited to, a hydrogel, fibrin, fibrinogen, fibronectin, collagen, laminin, elastin, gelatin, MATRIGEL®, polyorthoester, polyvinyl alcohol, polyamide, polycarbonate, agarose, alginate, polyethylene glycol, polylactic acid, polyglycolic acid, polycaprolactone, polyvinyl pyrrolidone, a marine adhesive protein, cyanoacrylate, polymeric hydrogel, analogs or a combination thereof. In certain embodiments, the ECM can further include peptides, proteins, carbohydrates, dextran, hyaluronic acid or a combination thereof. In certain embodiments, the ECM can include collagen. In certain embodiments, the ECM can include gelatin.

In certain embodiments, the biomimetic eye model 100 can include one or more chemicals and/or drugs positioned within the scaffold 101, e.g., within the pores of the scaffold 101 and/or within the ECM that can be present within the scaffold 101. In certain embodiments, one or more engineered materials, e.g., therapeutic micro/nanoparticles, drug releasing micro/nanoparticles, chemical releasing micro/nanoparticles and/or imaging probes, can be positioned within the scaffold 101 and/or within the ECM that can be present within the scaffold 101.

Figure 7B:
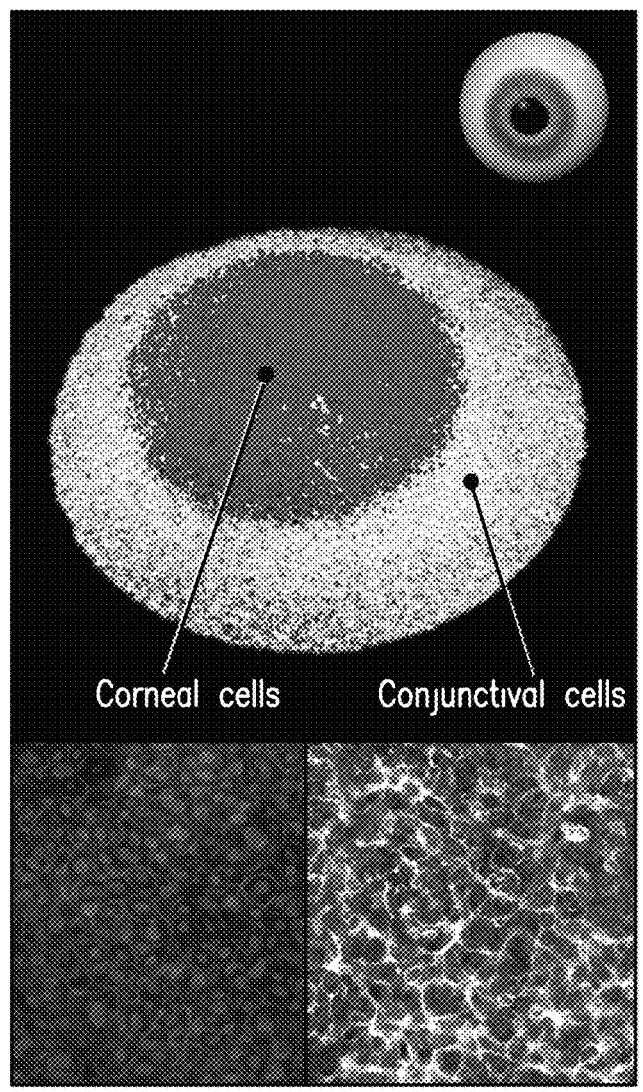

In certain embodiments, the biomimetic eye model 100 can further include one or more cells, cell types and/or cell layers 103 positioned on the surface of the scaffold 101, e.g., positioned on the convex surface of the scaffold and/or on the concave surface of the scaffold. In certain embodiments, the biomimetic eye model 100 can include 1 or more, 2 or more, 3 or more, 4 or more or 5 or more cell layers positioned on the surface of the scaffold 101. In certain embodiments, the one or more cell types can include one or more epithelial cell types. In certain embodiments, the epithelial cell types can include corneal and/or conjunctival epithelial cells, e.g., positioned on the convex surface of the scaffold. In certain embodiments, the one or more cell types can be positioned in a particular pattern. For example, and not by way of limitation, the pattern can be a concentric circular pattern. In certain embodiments, corneal epithelial cells are positioned in the center of the convex portion of the scaffold in a circular pattern, as depicted in FIG. 7. In certain embodiments, the circular pattern of the corneal epithelial cells can have a diameter of about 1 mm to about 24 mm, e.g., about 1 mm to about 6 mm, to mimic varying sizes of the cornea in different species. For example, and not by way of limitation, about $1.0 \times 10^3$ to about $1.0 \times 10^5$, e.g., about $1.5 \times 10^4$, of corneal epithelial cells, e.g., human primary corneal epithelial cells, can be used to form corneal tissue with diameter of about 3 mm.

In certain embodiments, the conjunctival epithelial cells can be positioned around the corneal epithelial cells in a circular pattern as depicted in FIG. 7. The positioning of the corneal and conjunctival epithelial cells in a circular pattern can mimic the 3D architecture and tissue organization of the eye. In certain embodiments, the circular pattern of the conjunctival epithelial cells can have a diameter of about 1 mm to about 30 mm, e.g., about 6 mm to about 30 mm. For example, and not by way of limitation, about $1.0 \times 10^3$ to about $1.0 \times 10^5$, e.g., about $4.2 \times 10^4$, conjunctival epithelial cells, e.g., human primary conjunctival epithelial cells, can be used to form conjunctival tissue with diameter of about 6 mm.

In certain embodiments, the biomimetic eye model 100 can further include one or more endothelial layers 107. For example, and not by way of limitation, the endothelial layer 107 can be positioned on the concave surface of the scaffold 101. In certain embodiments, the endothelial cells can be positioned in a circular pattern. In certain embodiments, the positioning of the corneal and conjunctival epithelial cells, the keratocytes and the corneal endothelial cells can mimic the 3D architecture and tissue organization of the eye.

In certain embodiments, the biomimetic eye model 100 disclosed herein can include an eyelid 104, e.g., coupled to the fluidic device 102. "Coupled" as used herein refers to the connection of a component to another component by any means known in the art. The type of coupling used to connect two or more components can depend on the scale and operability of the model. For example, and not by way of limitation, coupling of two or more components can include one or more joints, valves, fittings, couplings or sealing elements. Non-limiting examples of joints include threaded joints, soldered joints, welded joints, compression joints, ball and socket joints, universal joints and mechanical joints. Non-limiting examples of fittings include coupling fittings, reducing coupling fittings, union fittings, tee fittings, cross fittings and flange fittings. For example, and not by way of limitation, the biomimetic eyelid can be coupled to one or more motors by matching geometrical shapes of motor axis ends and eyelid axis ends. For example, and not by way of limitation, the tip of the motor shaft can be designed to have extruded (male) features that can be coupled with intruded (female) features created at the tip of the shaft attached to the fabricated eyelid.

In certain embodiments, the eyelid 104 can be generated by 3D printing technology. In certain embodiments, the eyelid 104 can be generated from a polymer, e.g., a thermoplastic, a metal alloy, e.g., titanium alloy, ceramic, paper and/or plaster. For example, and not by way of limitation, biocompatible materials can be used for 3D printing such as MED610, MED620, MED670 and MED680 from Stratasys Ltd. Hydrogel materials that can be used for 3D printing include, but are not limited to, fibrin, fibrinogen, fibronectin, collagen, laminin, elastin, gelatin, MATRIGEL®, polyorthoester, polyvinyl alcohol, polyamide, polycarbonate, agarose, alginate, polyethylene glycol, polylactic acid, polyglycolic acid, polycaprolactone, polyvinyl pyrrolidone, a marine adhesive protein, cyanoacrylate, polymeric hydrogel analogs and a combination thereof. In certain embodiments, the eyelid can be made of magnetic materials, electrically responsive materials and/or chemically responsive materials. Alternatively or additionally, the eyelid can be made of a hydrated polymer, e.g., a hydrogel, as described above. For example, and not by way of limitation, a gelatin hydrogel cross-linked by transglutaminase can be used for the biomimetic eyelid by using replica molding techniques. In certain embodiments, the eyelid 104 can mimic the blinking frequency that occurs during normal functioning of an eye. For example, and not by way of limitation, the eyelid 104 can be programmed to open and close at a frequency of about 3 times/min to about 50 times/min, e.g., about 12 times/min, to replicate delayed, normal and excessive blinking.

In certain embodiments, the biomimetic eye model 100 disclosed herein can further include a motor 106 for controlling the eyelid 104 (see, also, FIG. 8A). For example, and not by way of limitation, the physiological patterns and kinematics of eye blinking can be stimulated by controlling the amplitude, duration and frequency of movements using a motor 106. Non-limiting examples of a motor 106 that can be coupled to the eyelid 104 for use in the disclosed biomimetic eye model 100 include an electromagnetic motor such as a DC motor, an AC motor or a Stepper motor. Motors and biomimetic hydrogel eyelids can be coupled by using various methods. For example, and not by way of limitation, the tip of the motor shaft can be designed to have extruded (male) features that can be inserted into intruded (female) features created at the tip of the T-shaped holder embedded in the hydrogel eyelid layer. In certain embodiments, the DC motor can be a brushed DC motor or a brushless DC motor or piezoelectric motor, e.g., outer or inner rotor. In certain embodiments, the Stepper motor can include a variable reluctance, a permanent magnet or a hybrid Stepper motor. Non-limiting examples of AC motors include induction motors and synchronous motors. In certain embodiments, the disclosed biomimetic eye model includes a DC motor 106. In certain embodiments, the motor 106 can be further coupled to a device that controls the motor, e.g., a computer.

In certain embodiments, the biomimetic eye model 100 can further include an electromagnet coupled to the fabricated eyelid containing magnetic materials. In certain embodiments, the biomimetic eye model 100 can further include a computer coupled to the electromagnet for controlling strength and distribution of magnetic field. In certain embodiments, the biomimetic eye model 100 can further include one or more fluidic channels to deliver chemicals to the fabricated eyelid 104 made of a chemically responsive material. In certain embodiments, the biomimetic eye model 100 can further include one or more electrodes to apply electric potential to the fabricated eyelid 104 made of electrically responsive materials.

In certain embodiments, the biomimetic eye model 100 can contain one or more bioactive substances. Non-limiting examples of bioactive substance(s) include, but are not limited to, hormones, growth factors, interferons, interleukins, chemokines, cytokines, chemotactic factors, extracellular matrix components, and adhesion molecules, ligands and peptides, such as growth hormones. In certain embodiments, the fabricated eyelid 104 can include chemicals and drug compounds. In certain embodiments, the biomimetic eye model 100 can contain pathogens such as bacteria, fungi, viruses, protozoa and parasites. In certain embodiments, the biomimetic eye model 100 can contain resident immune cells such as macrophages and dendritic cells. In certain embodiments, such bioactive substances, pathogens and immune cells can be present within the ECM, the eyelid 104, the scaffold 101 and/or the fluidic device 102, e.g., in a fluid present within the flow chamber 105, of the biomimetic eye model 100.

In certain embodiments, the biomimetic eye model 100 can be integrated into an ophthalmic diagnostic device such as an ophthalmic camera, corneal electrode, keratoscope, diagnostic condensing lens, polymethylmethacrylate (PMMA) diagnostic contact lens, ophthalmic contact lens radius measuring device, Schirmer strip, stereoscope and optical coherence tomography (OCT). For example, and not by way of limitation, the biomimetic eye model 100 can be mounted on an OCT device for imaging, as depicted in FIG. 14.

Methods of Fabricating the Biomimetic Eye Model

The presently disclosed subject matter further provides methods for fabricating the disclosed biomimetic eye model.

Figure 2:
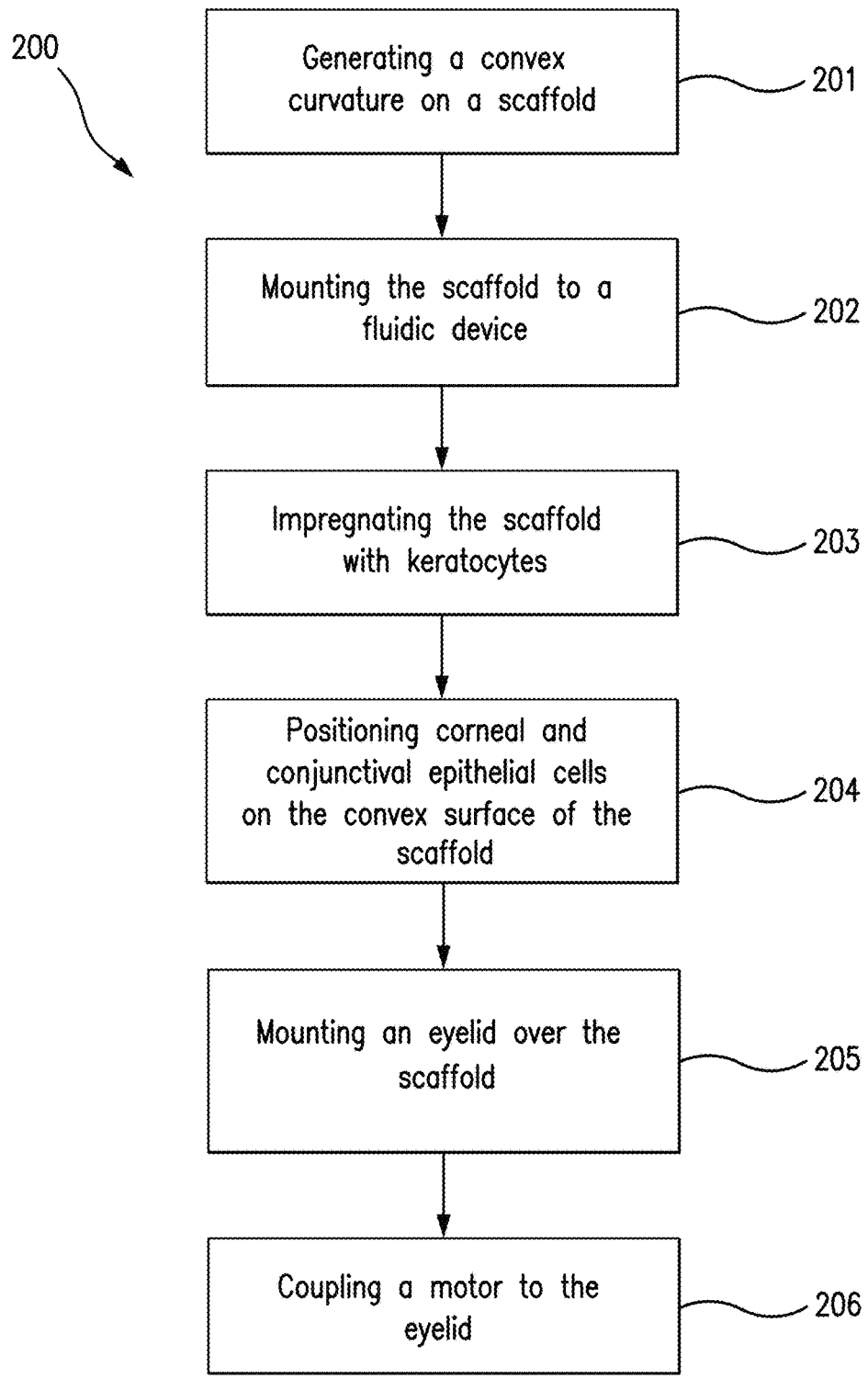
FIG. 2 depicts a schematic representation of an exemplary method according to the disclosed subject matter.

For the purpose of illustration and not limitation, FIG. 2 is a schematic representation of an exemplary fabrication method according to the disclosed subject matter. The method for fabricating the disclosed biomimetic eye model 200 includes the generation of a scaffold 201. The scaffold can be generated to have a 3D curvature that mimics the curvature of the cornea in vivo, e.g., through a thermal deformation technique. For example, and not by way of limitation, generation of the scaffold can include generating a planar scaffold and placing the planar scaffold between convex and concave molds produced by 3D printing that have curvature radii that are approximate to those of the human cornea as depicted in FIG. 3. In certain embodiments, the scaffold can be compressed at a high temperature for short periods of time to induce deformation of the scaffold to generate a curvature. The temperature can be any temperature that allows deformation of the scaffold. In certain embodiments, the temperature can be from about 80° C. to about 270° C. for a period of time from about 5 min to about 60 min. For example, and not by way of limitation, the scaffold with a 3D curvature can be generated by compressing a planar scaffold at about 100° C. for about 20 min. Alternatively or additionally, the scaffold can be deformed by applying pressure to the scaffold.

In certain embodiments, a convex curvature on the scaffold can be produced by replica molding of a convex mold. In certain embodiments, a convex curvature on the scaffold can be produced by electro-spinning of polymeric materials on a convex mold. In certain embodiments, a convex curvature on the scaffold can be produced by inflating a stretchable planar membrane using hydraulic or pneumatic pressure. In certain embodiments, a convex curvature on the scaffold can be produced by decellularizing a native ocular tissue. In certain embodiments, a convex curvature on the scaffold can be produced by three-dimensionally printing polymers into desired shapes. In certain embodiments, a convex curvature on the scaffold can be produced by illuminating photocurable polymer resins with light to generate 3D structures.

Figure 4B:
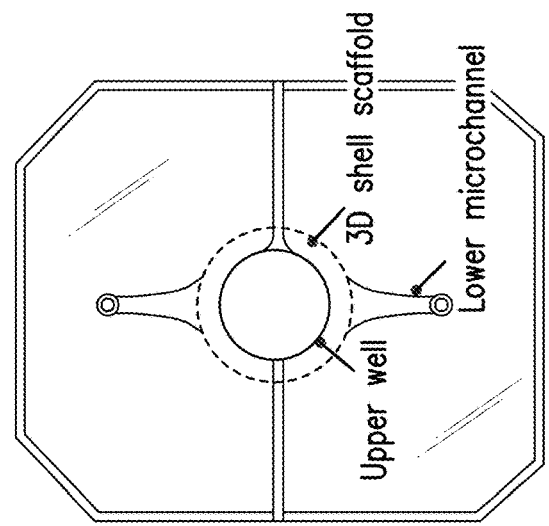
FIG. 4A-B. (A) Assembly of the upper chamber, the intervening 3D shell scaffold and the lower fluidic channel. (B) A top-down view of the assembled device.
Figure 4A:
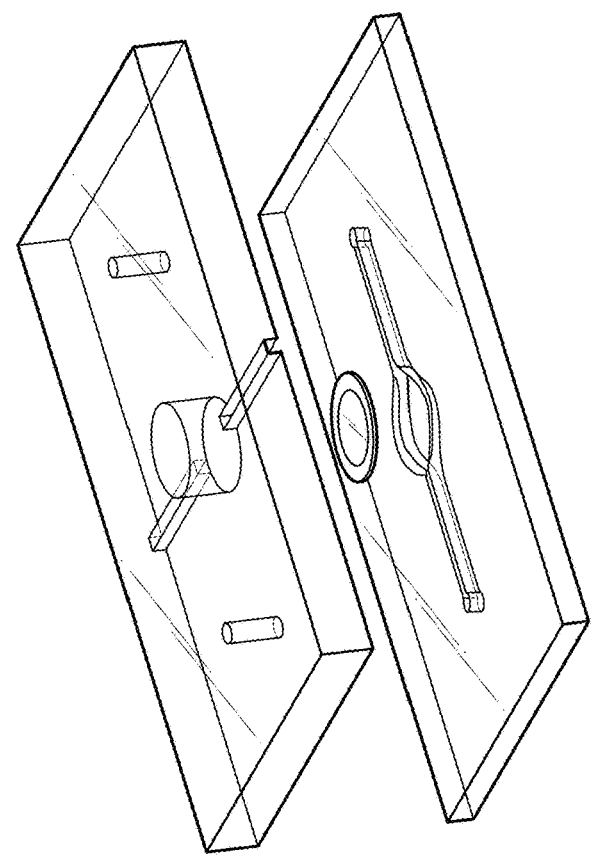

In certain embodiments, the method can further include mounting the scaffold to a fluidic device 202. For example, and not by way of limitation, the scaffold can be permanently or temporarily mounted to the surface of the fluidic device. Alternatively, the scaffold can be mounted between the upper and lower portions of the fluidic device as depicted in FIGS. 1 and 4 (see, for example, 108 and 109 of FIG. 1). In certain embodiments, the scaffold can be permanently mounted to the device through the use of an adhesive, clamps, clips and/or screws.

The method can further include the impregnation of the scaffold with one or more cell types 203. For example, and not by way of limitation, the one or more cell types can include keratocytes. Impregnation of the scaffold with one or more cell types can include the deposition of a cell suspension, e.g., cells suspended in ECM, to the convex or concave surface of the scaffold. For example, and not by way of limitation, about $1.0 \times 10^3$ to about $1.0 \times 10^5$, e.g., about $2 \times 10^4$, keratocytes can be seeded to each device. In certain embodiments, suction, e.g., through a vacuum, can then be applied to the opposite side of the scaffold to facilitate the entry and penetration of the cells and solution into the pores of the scaffold, as depicted in FIG. 5. Alternatively or additionally, the keratocytes and/or the ECM can enter the scaffold by capillary action. Subsequent gelation of the ECM solution can result in a scaffold whose pores are filled with ECM hydrogel and one or more cell types, e.g., keratocytes.

In certain embodiments, the method for impregnating the scaffold with one or more cell types can include introducing cells to the convex or concave curvature of a scaffold and inducing them to migrate into a scaffold filled with an ECM, e.g., an ECM hydrogel, by generating concentration gradients of cell-attracting chemicals such as, but not limited to, chemoattractants, across the scaffold. In certain embodiments, the method can include introducing cells to the convex or concave curvature of a scaffold and inducing them to migrate into a scaffold filled with an ECM hydrogel by generating gradients of hydrogel stiffness across the scaffold. In certain embodiments, the method can include introducing cells to the convex or concave curvature of a scaffold and inducing them to migrate into a scaffold filled with an ECM, e.g., an ECM hydrogel, by generating concentration gradients of gases across the scaffold.

The method can further include the impregnation of the scaffold with one or more chemicals and/or drug compounds. In certain embodiments, the method can include depositing a solution containing one or more chemicals and/or drugs and an ECM to the convex or concave curvature of a scaffold having one more pores and applying suction to the opposite surface of the scaffold to facilitate entry of the chemicals into the one or more pores of the scaffold. The method can further include solidifying the ECM to result in the filling of the pores of the scaffold with one or more chemicals and the ECM. In certain embodiments, the ECM can include a hydrogel composition.

The method can further include the impregnation of the scaffold with one or more engineered materials including, but not limited to, therapeutic micro/nanoparticles, drug releasing micro/nanoparticles, chemical releasing micro/nanoparticles and/or imaging probes. In certain embodiments, the method can include depositing a solution containing one or more engineered materials and an ECM to the convex or concave curvature of a scaffold having one more pores and applying suction to the opposite surface of the scaffold to facilitate entry of chemicals into the one or more pores of the scaffold. In certain embodiments, the method can further include solidifying the ECM to result in the filling of the pores of the scaffold with one or more engineering materials and the ECM. In certain embodiments, the ECM can include a hydrogel composition.

The method can further include positioning one or more cell types and/or one or more cell layers on the surface of the scaffold 204. For example, and not by way of limitation, corneal and/or conjunctival epithelial cells can be adhered to the convex and/or concave surface of the scaffold. In certain embodiments, the positioning of a first cell layer of one or more cell types can include the deposition of one or more cells, e.g., corneal epithelial cells, in a concave well, e.g., a first concave well, and compressing it with the convex surface of the scaffold to form a circular pattern as depicted in FIG. 6. In certain embodiments, a suspension of cells, e.g., corneal cells, can include from about 1,000 s to about 1,000,000 s of cells. In certain embodiments, the concentration of corneal cell suspension solutions can be from about $1.0 \times 10^5$ cells/ml to about $1.0 \times 10^7$ cells/ml, e.g., about $1.5 \times 10^6$ cells/ml. For example, and not by way of limitation, about $1.0 \times 10^3$ to about $1.0 \times 10^5$, e.g., about $1.4 \times 10^4$, corneal cells can be used per biomimetic device. In certain embodiments, the entire device can be inverted to facilitate cell adhesion onto the convex surface of the scaffold. In certain embodiments, control of the cell spreading on the surface of the scaffold can be achieved by altering the volume of cell suspension with a fixed distance between the convex and concave surfaces. Additionally or alternatively, control of the cell spreading on the surface of the scaffold can be achieved by altering the distance (referred to as "d" within FIG. 6) between the well and the scaffold, e.g., by using micrometers to control the distance with high resolution. For example, and not by way of limitation, a distance of about 1 mm can be used for corneal cell patterning.

Once the corneal epithelial cells adhere to the surface of the scaffold, the method can further include depositing a second cell suspension of one or more cell types, e.g., conjunctival epithelial cells, in a concave well, e.g., a second concave well. In certain embodiments, the concentration of conjunctival cell suspension solutions can be from about $1.0 \times 10^5$ cells/ml to about $1.0 \times 10^7$ cells/ml, e.g., about $1.5 \times 10^6$ cells/ml. For example, and not by way of limitation, about $1.0 \times 10^3$ to about $1.0 \times 10^5$, e.g., about $1.4 \times 10^4$ conjunctival cells, can be used in each biomimetic device.

After deposition of the second cell suspension into a concave well, the cell suspension can be compressed with the scaffold that has corneal cells adhered to it, e.g., the convex surface of the scaffold, to generate a layer of conjunctival epithelial cells surrounding the circular pattern of corneal cells. For example, and not by way of limitation, a distance between the well and the convex surface can vary from about 400 µm to about 700 µm. FIG. 6 illustrates the spread of a cell suspension with a large distance versus a small distance between the well and the convex surface, i.e., different amounts of compression. In certain embodiments, the compression of the second cell suspension, e.g., conjunctival cells, between the concave well and the scaffold can be greater than the compression of the first cell suspension, e.g., corneal cells, between the concave well and the scaffold. This method generates a cell pattern on the scaffold that mimics the unique spatial distribution of corneal and conjunctival epithelial cell types on the ocular surface as depicted in FIG. 7.

In certain embodiments, a similar method as disclosed above can be used to adhere corneal and/or conjunctival epithelial cells on a concave surface of the scaffold. In certain embodiments, the method for adhering such cells can include depositing a first cell suspension containing one or more corneal epithelial cells into a first convex well and compressing the first cell suspension in the first convex well with the concave curvature of the scaffold to form a circular pattern of adhered corneal epithelial cells on the scaffold. In certain embodiments, the method can further include depositing a second cell suspension containing one or more conjunctival epithelial cells into a second convex well and compressing the second cell suspension in the second convex well with the concave curvature of the scaffold with the adhered corneal epithelial cells to form a circular pattern of adhered conjunctival epithelial cells surrounding the adhered corneal epithelial cells.

In certain embodiments, the method can further include depositing a cell suspension containing ocular endothelial cells onto the concave and/or convex surface of the scaffold to generate one or more layers of endothelial cells on the scaffold. Similar techniques for generating conjunctival and/or corneal epithelial cell layers on a surface of the scaffold can be used to generate one or more endothelial layers on a surface of the scaffold. For example, and not by way of limitation, about $1.0 \times 10^3$ to about $1.0 \times 10^6$ corneal endothelial cells can be used in each device.

In certain embodiments, the method can include culturing the scaffold with the one or more cells, cell types and/or cell layers to promote the formation of confluent monolayers and/or to promote further differentiation and stratification of the cell layers. For example, and not by way of limitation, the cells, e.g., corneal and/or conjunctival epithelial cells, can be cultured for about 1 to about 20 days, e.g., about 13 days, after deposition on the scaffold. In certain embodiments, the cells can be cultured in cell culture medium, where the cells are fully submerged in the medium for about 1 to about 5 days, e.g., by filling the upper chamber and the flow chamber of the fluidic device with cell culture medium. In certain embodiments, the cell culture medium can be removed from the upper chamber to expose the cells to the air and the cells can be further cultured under air-liquid interface (ALI) culturing conditions, e.g., for about 1 to about 15 days.

In certain embodiments, the mounting of the scaffold to the fluidic device can occur after the impregnation of the scaffold with one or more cells and/or cell types and/or the positioning of the one or more cell types and/or one or more cell layers on the surface of the scaffold.

In certain embodiments, the method can further include the mounting and/or coupling of an eyelid over the scaffold 205. In certain embodiments, the eyelid can be mounted to the surface of the fluidic device that surrounds the convex surface of the scaffold as depicted in FIG. 8. For example, and not by way of limitation, the eyelid can be designed to have two shafts extending in the lateral direction, each of which can be inserted into a hollow microchannel etched into the uppermost layer of the device that surrounds the convex surface of the scaffold. In certain embodiments, the shafts of the eyelid can be inserted into hollow channels on both sides of the well. For example, two eyelid shafts can be inserted into these two hollow channels after the corneal and conjunctival tissue formation. In certain embodiments, the eyelid, e.g., hydrogel eyelid, can be placed on top of the scaffold, as shown in FIG. 10. For example, and not by way of limitation, the hydrogel eyelid can include a planar hydrogel slab coupled to a T-shaped holder. During hydrogel eyelid fabrication, the T-shaped holder can be embedded in the hydrogel. In certain embodiments, the method can further include the coupling of a motor to the eyelid 206 and/or the fluidic device. For example, and not by way of limitation, the T-shaped holder of the hydrogel eyelid can be connected to the shaft of an electric motor, e.g., by one or more hollow elastomeric tubes.

Methods of Using the Eye Model

The presently disclosed subject matter further provides methods of using the disclosed biomimetic eye model.

In certain embodiments, the biomimetic eye model can be used to study the normal physiological conditions of the eye. For example, the biomimetic eye model can be used to analyze the effect blinking has on the barrier integrity, cellular processes (e.g., proliferation, differentiation and apoptosis) and/or environment of the eye. Alternatively, the rate of blinking of the eyelid can be altered (e.g., increased and/or decreased frequency, speed and/or acceleration, duration of eye opening and closure between blinking) to determine the effect different rates of blinking can have on the integrity, condition, fluid dynamics and/or environment of the eye. Other non-limiting examples of methods of using the disclosed biomimetic eye model can include recruitment of limbal stem cells, replenishment of the cornea and conjunctiva, dynamics of tear film, interaction of the tear film with epithelial cells and interaction between tear fluid proteins.

In certain embodiments, the disclosed biomimetic eye model can be used to model eye disease states and/or disease progression. In certain embodiments, the biomimetic eye model can be used to recapitulate abnormal changes in the structure, function and environment of the ocular surface during the development and progression of ocular diseases, including increased evaporation of tear film, changes in osmolarity of tear fluid, reduced production of tear fluid, alterations in the composition of tear fluid, alterations in the rate of eye blinking, alterations in the force and pressure of eye blinking, alterations in the size, number and volume of epithelial cells, disruption in the barrier function of the epithelial cells, damage to epithelial integrity, changes in mucus distribution on the epithelial cells, alterations in the curvature of the ocular surface, alterations in the hydrostatic pressure of the anterior chamber, exposure to inflammatory cytokines and pathogens (e.g., bacteria and viruses), recruitment of immune cells, up-regulation and/or down-regulation of disease-related genes, increased and/or decreased expression of disease-related proteins, activation of keratocytes and other stromal cells in the cornea and conjunctiva, fibrosis of stroma, disorganization of extracellular matrix structure and damages in the basement membrane. Non-limiting examples of disease states that can be studied using the disclosed biomimetic eye model include dry eye syndrome (keratoconjunctivitis sicca (KCS)), ocular infections, parasitic infections, bacterial and/or fungal keratitis, Fuchs' Dystrophy, conjunctivitis, trachoma, glaucoma, blepharitis, mucous membrane pemphigoid and Sjoren's syndrome. The disclosed biomimetic eye model can be further used to identify therapeutic agents that can have a beneficial effect on a disease state. For example, and not by way of limitation, the model can be used to identify eye drop compositions that can be beneficial or harmful for combating dry eyes, ocular infection and inflammation.

The biomimetic eye model can be further used to model eye injuries and/or traumas. Non-limiting examples of eye injuries include injuries to the corneal and conjunctival epithelium or endothelium, injuries to the stroma, corneal abrasions and lacerations, chemical burns, thermal burns, scars, ulcers, surgical damage and wounds. For example, and not by way of limitation, the biomimetic eye model can be used to identify compositions that can useful for enhancing the healing of the ocular surface affected by an eye injury and/or trauma.

In certain embodiments, the disclosed eye model can be used to determine whether certain compositions such as, but not limited to, cosmetics, cleaning products, chemicals and/or environmental stimuli, have an adverse effect on the condition of the eye. For example, and not by way of limitation, the composition can be a liquid formulation such as aqueous solutions, eye drops, emulsions, oily solutions, micelles, solvents and/or surfactants. In certain embodiments, the composition can be a fluid formulation (e.g., emulsions and gels) that includes ointments, creams and lotions. In certain embodiments, the composition can include soluble and insoluble solids (e.g., stone), toxic and non-toxic gases and/or vapors. In certain embodiments, the composition can include a variety of particle sizes, such as dusts, fibers and/or nanoparticles. In certain embodiments, the composition can be a pharmaceutical or a dermatological composition such as, for example, a pharmaceutical composition including any active pharmaceutical ingredient. In certain embodiments, the composition can be an excipient, a detergent or a cosmetic product, e.g., a make-up product.

In certain embodiments, the biomimetic eye model can be used to test delivery of ocular drug compounds and/or consumer products through the ocular surface. For example, and not by way of limitation, pharmacokinetics can be evaluated by measuring ocular absorption and clearance of compounds by tear fluid/lacrimal drainage.

The disclosed biomimetic eye model can be further used to determine the safety and longevity of contact lenses such as rigid gas permeable contact lens and soft contact lens. For example, and not by way of limitation, the biomimetic eye can be used to design contact lens that can be used with eyes that have an astigmatism. The disclosed biomimetic eye model can be also used for investigating ocular developmental by using fetal corneal and conjunctival cells isolated at different developmental stages.

In certain embodiments, the disclosed biomimetic eye model can be used as an eye model for practicing and/or performing robotic ocular surgery and/or LASIK eye surgery. In certain embodiments, the disclosed biomimetic eye model can be used to test safety and effectiveness of surgical devices such as a powered corneal burr, radiofrequency electrosurgical cautery apparatus, thermal cautery unit, scleral plug, cryophthalmic unit, ophthalmic knife test drum, ophthalmic electrolysis unit, intraocular gas, intraocular fluid, intraocular pressure measuring device, intraocular lens guide, manual ophthalmic surgical instrument, ocular surgery irrigation device, keratome, ophthalmic laser, electronic metal locator, ac-powered magnet, permanent magnet, ophthalmic surgical marker, ocular pressure applicator, phacofragmentation system, ophthalmic photocoagulator, ophthalmic operating spectacles and ophthalmic sponge.

In certain embodiments, the disclosed biomimetic eye model can be used to determine the safety, longevity and effectiveness of biomedical devices. For example, and not by way of limitation, the biomimetic eye can be used to study the effectiveness and safety of ocular implants such as intraocular drug delivery systems, stents, shunts, ophthalmic tantalum clips, ophthalmic conformers, absorbable implants, keratoprosthesis, intraocular lens and scleral shells.

In certain embodiments, and as indicated above, the biomimetic eye model can be used to model and/or study glaucoma. For example, and not by way of limitation, the fluid channel of the fluidic device can include a physiological fluid, e.g., aqueous humor, at a high pressure to replicate the intraocular pressure of glaucoma. In certain embodiments, the pressure of the fluid within the fluidic device can be greater than about 22 millimeters of Mercury (mm HG), greater than about 25 mm HG, greater than about 30 mm HG or greater than about 40 mm HG.

In certain embodiments, as indicated above and as shown in FIG. 15, the biomimetic eye model can be used to study dry eye syndrome. For example, and not by way of limitation, the biomimetic eye model can be subjected to low humidity conditions to model dry eye syndrome. In certain embodiments, the biomimetic eye model can be placed in a low humidity chamber having a temperature from about 35° C. to about 40° C., e.g., 37° C., and/or a relative humidity from about 0% to about 60%, from about 10% to about 50% or from about 20% to about 40%. In certain embodiments, the biomimetic eye model can be placed in a low humidity chamber having a relative humidity of about 25% or about 40%. In certain embodiments, the biomimetic eye model can be subjected to air that has a relative humidity of less than about 60%, less than about 55%, less than about 50%, less than about 45%, less than about 40%, less than about 35%, less than about 30%, less than about 25%, less than about 20%, less than about 15% or less than about 10% to mimic dry eye syndrome. In certain embodiments, dry eye conditions can be induced by reducing blinking frequencies to increase eye-opening phase during which evaporation of tear fluid occurs. In certain embodiments, dry eye conditions can be induced by decreasing secretion of tear fluid in the biomimetic eye model. In certain embodiments, dry eye conditions can be induced by genetically modifying the ocular cells in the device to have altered mucus distribution on the ocular surface.

The following examples are offered to more fully illustrate the invention, but are not to be construed as limiting the scope thereof.

EXAMPLES

Example 1: Methods of Fabricating a Blinking Eye Model

Figure 1B:
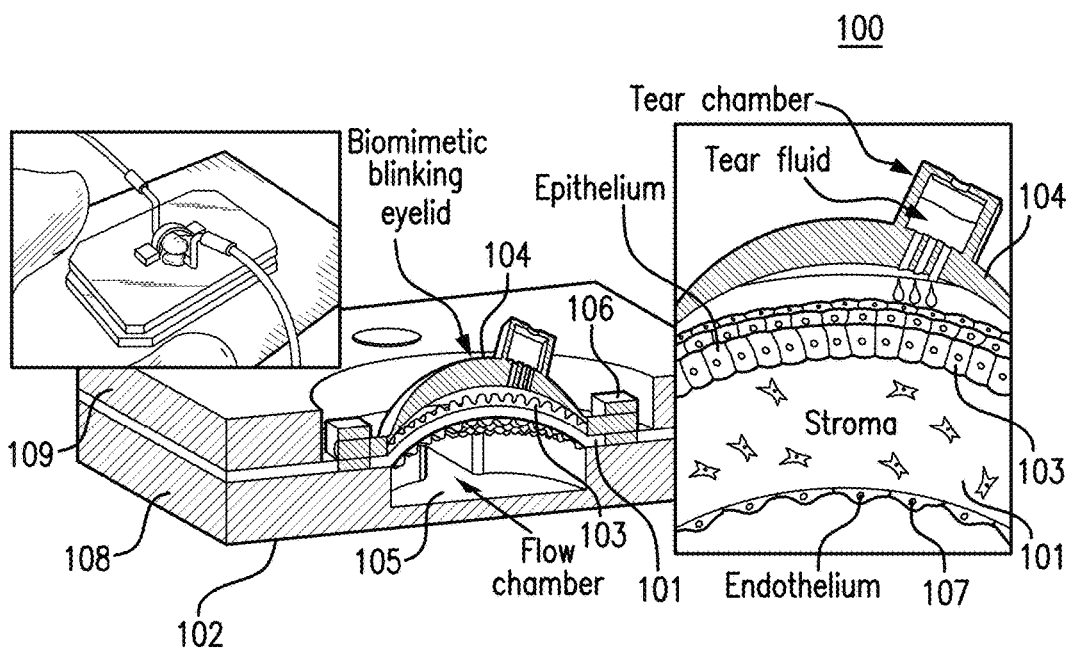

In this Example, a human blinking "eye-on-a-chip" system that synergistically integrates "organs-on-chips" technologies with 3D printing, ocular biology and clinical medicine is described. This microengineered organomimetic model of the blinking human eye can provide an innovative alternative in vitro testing and investigation platforms that replicates 3D architecture, differentiated physiological functionality and dynamic microenvironment of the human ocular surface (FIG. 1B). The ocular surface is under the constant influence of dynamic microenvironment created by spontaneous eye blinking-induced eyelid movements and concomitant spreading of the tear film that permits hydration and lubrication of the cornea and conjunctiva (FIG. 1A). The disclosed eye model can recapitulate such a dynamic microenvironment.

Microengineered Biomimetic 3D Porous Shell Scaffolds

The porous 3D shell scaffolds used in this model are generated by microengineering planar cell culture scaffolds to have 3D curvature that closely match that of the cornea in vivo. Specifically, polystyrene planar cell culture scaffolds were placed between convex and concave molds produced by 3D printing to have radii of curvature that approximate those of the human cornea (FIG. 3A-D). The scaffolds were then compressed at high temperature for short periods of time to induce plastic deformation and to generate curvature.

As shown in FIG. 3C, these microengineered scaffolds contain complex networks of interconnected microscopic pores.

In this method, the dimensions and geometry of the final 3D scaffolds can be readily controlled by changing the shape and size of the 3D printed overlying and underlying molds. This thermal deformation technique was also applicable to various types of planar cell culture scaffolds that are made of different materials and/or have different porosity and thickness. When hydrated for cell culture, the 3D shell scaffolds in this model retained the original curvature, and their structural stability was maintained throughout prolonged cell culture.

Integration of Biomimetic 3D Cell Culture Scaffolds with Fluidic Channels

Figure 3D:
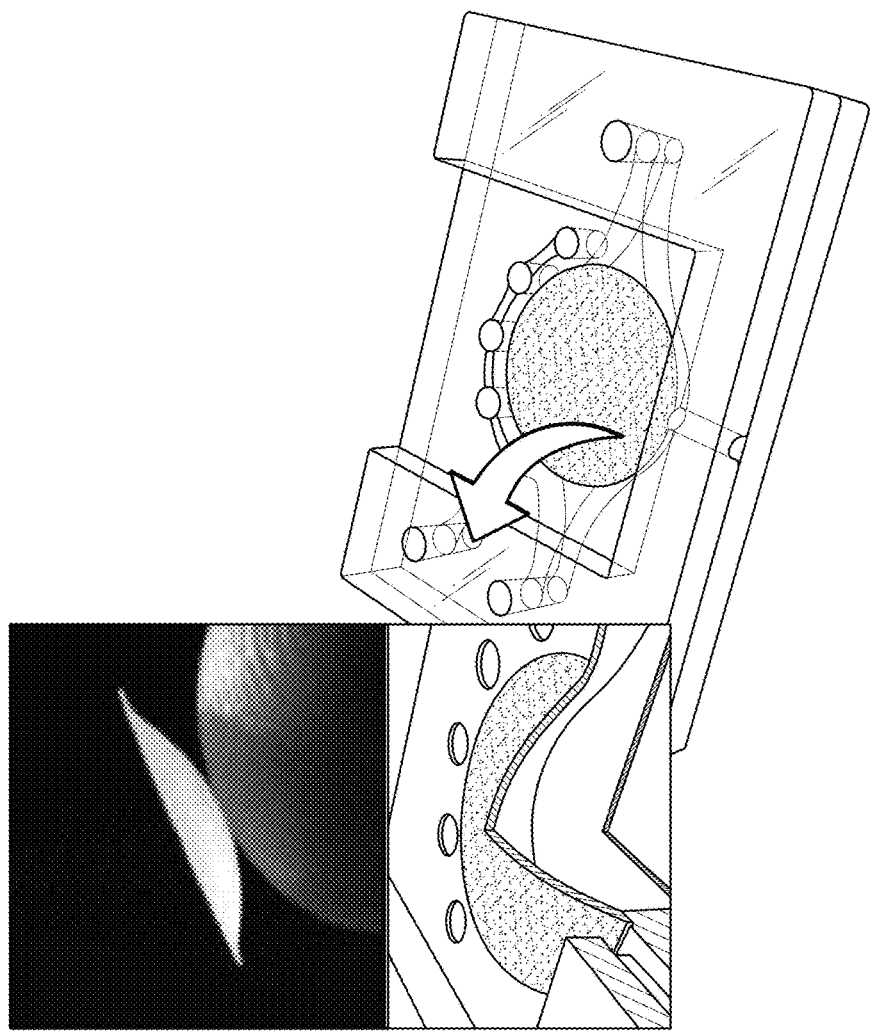

The dome-shaped 3D shell scaffolds were incorporated into the eye-on-a-chip system by sandwiching them between the upper and lower PDMS slabs that contain a circular chamber and a fluidic channel, respectively (FIG. 3D and FIG. 4). The fluidic channel in the lower slab allowed for continuous flow of culture medium to supply nutrients and oxygen to the ocular cells embedded in the 3D scaffolds and cultured on the scaffold surface. The upper slab contained an open circular chamber at the center, which enabled easy access to the cell culture scaffolds as well as the integration of microengineered biomimetic eyelids. As the first step of device assembly, the shell scaffold was glued to the bottom fluidic channel. Subsequently, the top PDMS slab was bonded permanently to the scaffold and the bottom slab. The scaffold was integrated into fluidic devices by using PDMS stamping method, in which uncured PDMS is used as a glue to permanently bond PDMS to the scaffold. For this, a thin layer of PDMS was spin-coated and the flat base of the scaffold was stamped onto this thin layer. After placing the scaffold on the fluidic device, the entire device was incubated at elevated temperature to cure the PDMS glue layer and completely seal the device.

Formation of Corneal Stromal Layer

To recreate a stromal layer in the cornea, the porous 3D scaffold was impregnated with human primary keratocytes (the cell type found in corneal stroma in vivo) suspended in an extracellular matrix (ECM) precursor solution. Specifically, the cell-containing solution was first deposited uniformly over the entire top convex surface of the shell scaffold (FIG. 5A). Following this step, vacuum was applied to the concave side of the scaffold to facilitate the entry and penetration of the cells and hydrogel solution into the pores of the scaffold (FIG. 5A). For this, the inlet access port of the microchannel underlying the scaffold was clamped, and vacuum was applied to the outlet of the channel. Subsequent gelation produced microengineered 3D tissue constructs whose pores were filled with keratocyte-laden ECM hydrogel to mimic the stromal tissue in the human cornea. This methods permitted deep penetration and long-term 3D culture of human keratocytes (FIG. 5B).

Formation Corneal and Conjunctival Tissue by 3D Cell Patterning Technique

Figure 6A:
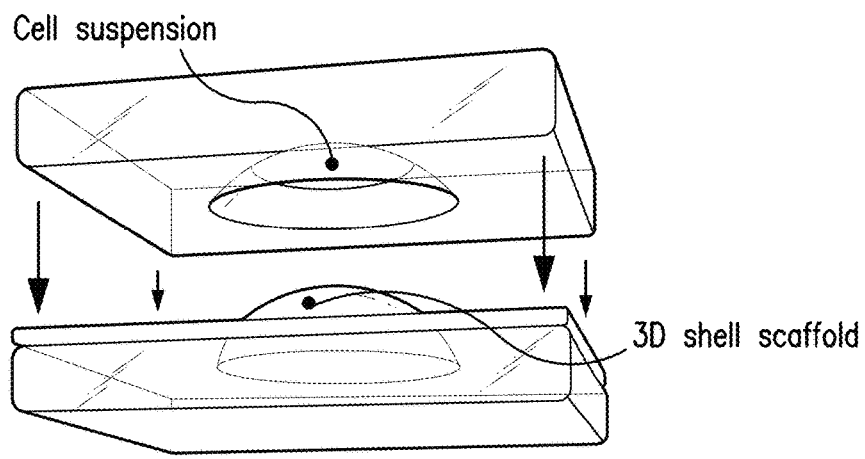
FIG. 6A-F. (A) Compression of a cell suspension solution. (B) Spreading of the compressed cell suspension is controlled by the magnitude of compression. Dots show the margin of fluid on the scaffold. (C) Two-step process for patterning corneal and conjunctival epithelial cells. (D) Image of scaffold with no cell suspension. (E) Spreading of a corneal epithelial cell suspension by using compression. (F) Spreading of a conjunctival epithelial cell suspension by using compression.
Figure 6B:
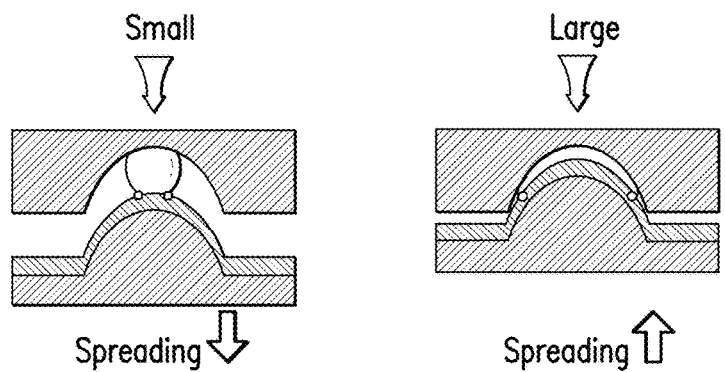
Figure 6C:
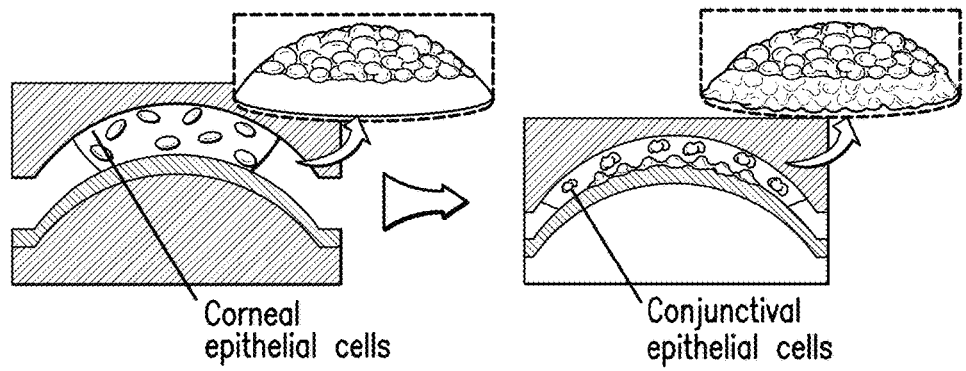
Figures 6E, 6F:
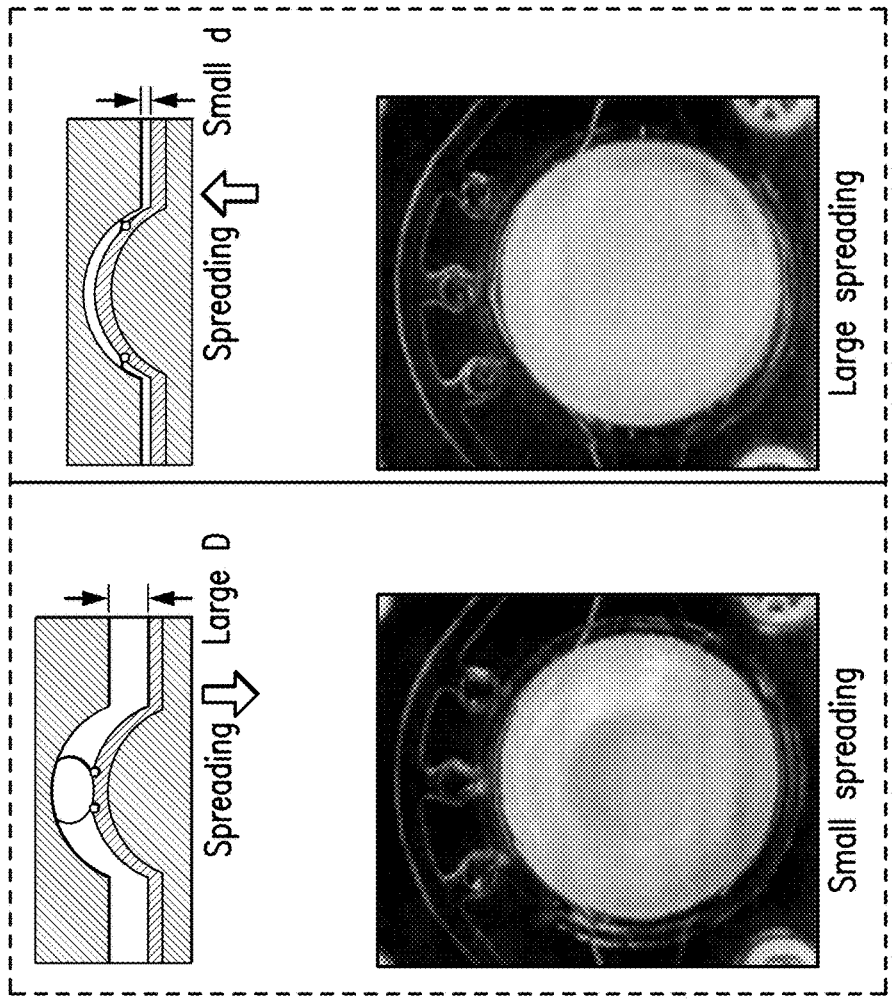
Figure 6D:
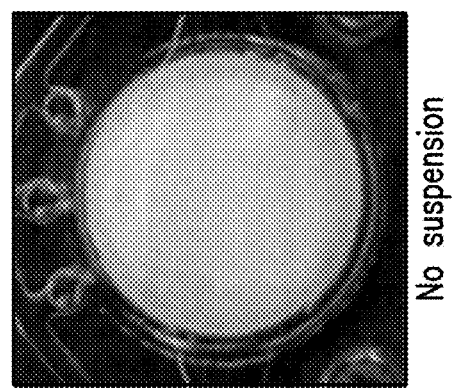

To mimic the unique spatial distribution of corneal and conjunctival epithelial cell types on the ocular surface, concentric patterns of epithelial tissues were generate on the scaffolds using novel 3D cell patterning techniques. This technique was based on the mechanical manipulation of an air-liquid interface formed by the compression of cell suspension solution between convex and concave surfaces in close opposition (FIG. 6). Initial seeding of corneal epithelial cells begun with depositing a drop of suspended cells in a concave well and compressing it with the convex surface or the microengineered stromal scaffold (FIG. 6A). By changing the distance (indicated as "d" or "D" within FIG. 6) between the well and the scaffold, which is readily attainable by controlling the compressive force, the spreading of cell suspension can be controlled, and thereby the position of the meniscus between the solution and surrounding air (FIG. 6B), which defines the margin or the corneal tissue in this system. Once the corneal epithelial cells established firm adhesion and populate the central area, the same procedure is carried out with conjunctival epithelial cells. In this step, the cell suspension solution was compressed to a greater extent to increase its spreading, which allow conjunctival cells to adhere to the peripheral region and to form a circumferential band of conjunctival epithelium surrounding the corneal tissue (FIG. 6C).

To demonstrate the feasibility of this spatial patterning technique, human corneal epithelial cells (HCECs) labeled with a green fluorescent dye were first plated at the center of the scaffold surface, and this step was followed by seeding of red-stained cells at the peripheral region. As shown in FIGS. 7A and B, this approach enabled the selective deposition and growth of color-coded cell populations in different regions on the curved 3D scaffold surface to achieve in vivo-like epithelial patterning. These data show that this system provides new microengineering approaches to reproduce the 3D architecture and characteristic tissue organization of the human eye.

Demonstration of Eye Blinking Motion

Simulation of eye blinking was accomplished by integrating a 3D-printed biomimetic eyelid into the upper chamber of the device. Blinking-like mechanical motions were generated by moving a 3D-printed thin shell structure connected to a miniature motor over the scaffold surface (FIG. 8). The patterns and kinematics of blinking motions such as velocity, durations, and frequencies were precisely controlled by a computerized miniature DC motor. This system can actuate the eyelid layer at physiological blinking frequencies and speeds previously reported in the literature (Doane, Am. J. Ophthalmol., 89(4):507-516 (1980)). This model system can be used to recapitulate the dynamics of the tear film spreading and ocular surface hydration.

Example 2: Methods of Fabricating a Blinking Eye Model with Hydrogel Eyelid

The ocular surface is maintained hydrated by action of spontaneous eye blinking. The aqueous components of the tear are secreted from the lacrimal glands located at the outer orbital of the eye. During blinking motions, the secreted tear fluid is dragged by the eyelid, spread over the ocular surface, and then drained into the small openings on the margin of each eyelid called lacrimal puncta to avoid tear overflow and to maintain basal tear volumes constant.

The eyelids play an important role in maintaining this physiological tear fluid dynamics. Their inner surfaces are lined with soft and smooth epithelial tissue, imparting mechanical flexibility that permits intimate conformal contact between the eyelids and the ocular surface. The eyelid surfaces also hold substantially larger water-binding capacity to facilitate fluid spreading and surface hydration during blinking (Pratchyapruit et al., Skin Research and Technology, 13:169-175 (2007)).

This Example discloses improvements to the eye-on-a-chip model discussed in Example 1 to fully recapitulate the entire cycle of tear fluid dynamics, as well as the mechanical and biochemical properties of the eyelids. Specifically, methods for fabricating flexible biomimetic eyelids in soft hydrogels derived from natural extracellular matrices were developed. Another modification is the inclusion of a network of fluidic channels that mimic secretion and drainage of tear fluids.

Fluidic Device Designs to Mimic the Entire Cycle of Tear Fluid Dynamics

To mimic the secretion and drainage of the tear fluid during each eye blinking cycle, the design of the fluidic device disclosed in Example 1 has been modified. The improved eye-on-a-chip microdevice includes three layers: the bottom PDMS slab containing a fluidic channel and microfabricated tear secretion duct, the middle porous 3D cell culture shell scaffold, and the top PDMS slab with a microengineered tear drainage duct (FIG. 9). The main flow channel in the bottom layer mimics the anterior chamber of the eye, and continuous flow of culture media through this channel supplies nutrients and oxygen to the ocular cells cultured in and on the 3D scaffold in a similar manner that the aqueous humor does in vivo. The bottom layer also contains several microfabricated openings interconnected by a tear secretion channel through which tear simulants are introduced. Tear fluids injected into the tear secretion channel ooze from the openings and then are carried over the scaffold surface as a result of blinking actuation, and this is followed by the flow of the fluids into the tear drainage duct.

Microengineering of Biomimetic Eyelids Using Hydrogels and 3D Printing Techniques The biomimetic eyelids were prepared from natural hydrogels using 3D printed molds and T-shaped holders. To fabricate these eyelids, a hydrogel precursor solution was poured into the 3D printed molds, and T-shaped holders were inserted into the liquid (FIG. 10A). The hydrogel precursor, gelatin, was then polymerized by either cross-linking or thermal reactions. The mechanical and biochemical properties of the final hydrogel slabs can be easily controlled by changing the hydrogel material and polymerization conditions. When these thin flexible hydrogel slabs were placed over the curved scaffold surface, they undergo elastic deformation to conform to the contour of the scaffold surface (FIG. 10B-C). After hydration, a thin watery layer was formed underneath the hydrogel slab, which mimics a thin tear film.

Surface Hydration of the 3D Scaffold from Hydrogel-Eyelid Blinking

Figure 11A:
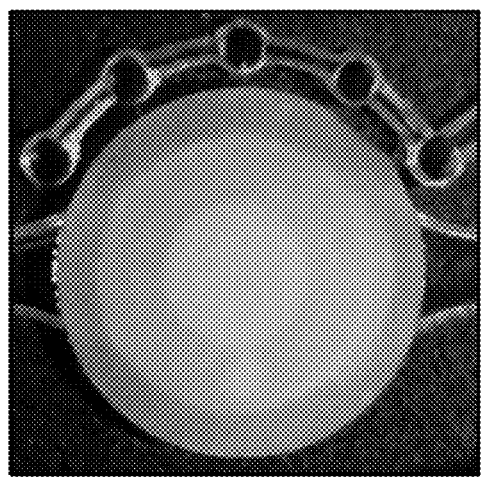
FIG. 11A-B. Hydration of the scaffold surface with a hydrogel eyelid. (A) Before hydration. (B) After hydration.
Figure 11B:
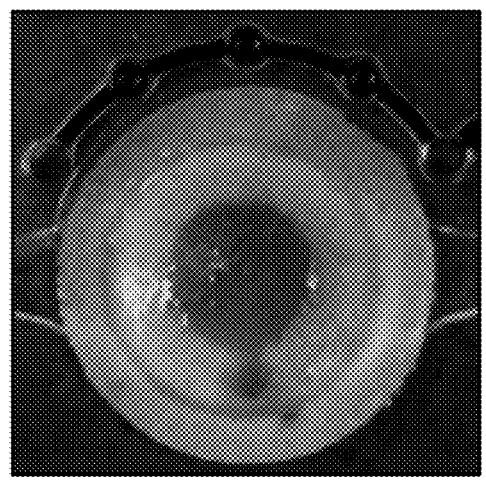

To demonstrate the feasibility of replicating tear fluid dynamics, hydration of the scaffold surface was tested by sliding the hydrogel slab over the scaffold. The biomimetic hydrogel eyelids slabs were linked to a computer-controlled linear DC motor, and actuated to freely move over the scaffold. During blinking actuation, food coloring dye was continuously injected into the tear secretion channel. When the hydrogel slab swept over the convex scaffold surface, a dye solution secreted from the openings of the tear secretion channel was dragged and spread to the entire scaffold surface (FIG. 11). Excessive liquid after blinking was drained through the drainage channel.

Demonstration of Blinking Actuation with Cell-Seeded Shell Scaffolds

Human corneal epithelial cells (HCECs) plated on top of the scaffold were exposed to cyclic blinking motions using hydrogel eyelids. Blinking frequency was adjusted to mimic physiological conditions, which is 12 times per minute, and the cultured cells were imaged using confocal microscopy after exposure to blinking-induced mechanical stimuli. Results from these tests showed that the corneal cells remained attached without significant loss of viability after blinking actuation (FIG. 12A-C). This model can allow the systematical investigation of morphological and functional changes of the cells after blinking.

Example 3: Analysis of Ocular Cell Differentiation

To validate that the ocular surface cells, e.g., the corneal and conjunctival cells, are fully differentiated and mimic their physiological functions found in vivo, a number of biological assays were performed.

Figure 13A:
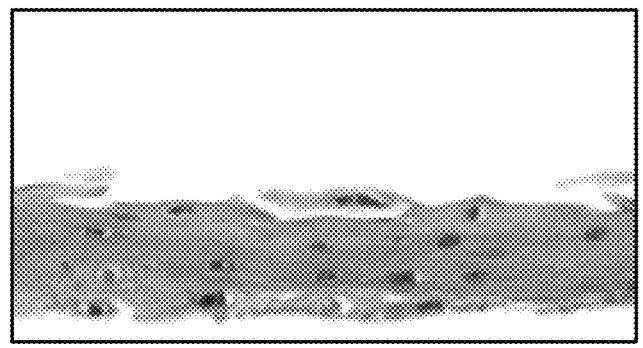
FIG. 13A-G. Differentiation of ocular cells within the biomimetic eye model. (A) Stratified histological structures of the corneal epithelial layers. (B) Occludin expression in cultured corneal epithelial cells. (C) CK-3/12 expression in corneal epithelial cells after air-liquid interface culturing. (D) CK-19 expression in conjunctival epithelial cells before air-liquid interface culturing. (E) CK-19 expression in conjunctival epithelial cells after air-liquid interface culturing. (F) MUC5AC expression in conjunctival epithelial cells after air-liquid interface culturing. (G) Culturing of the corneal and conjunctival epithelial cells on the scaffold.
Figure 13B:
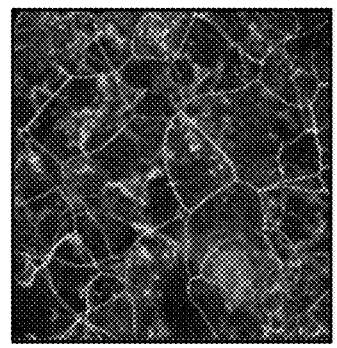
Figure 13C:
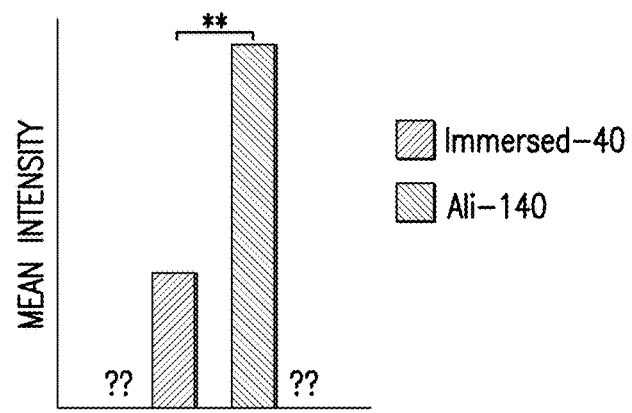
Figure 13D:
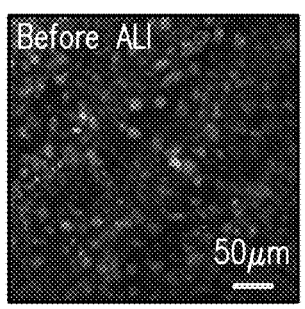
Figure 13E:
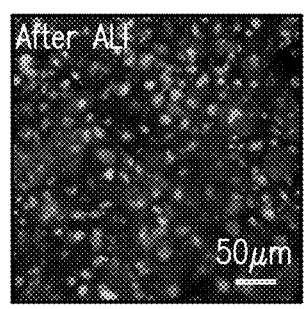
Figure 13F:
Figure 13G:
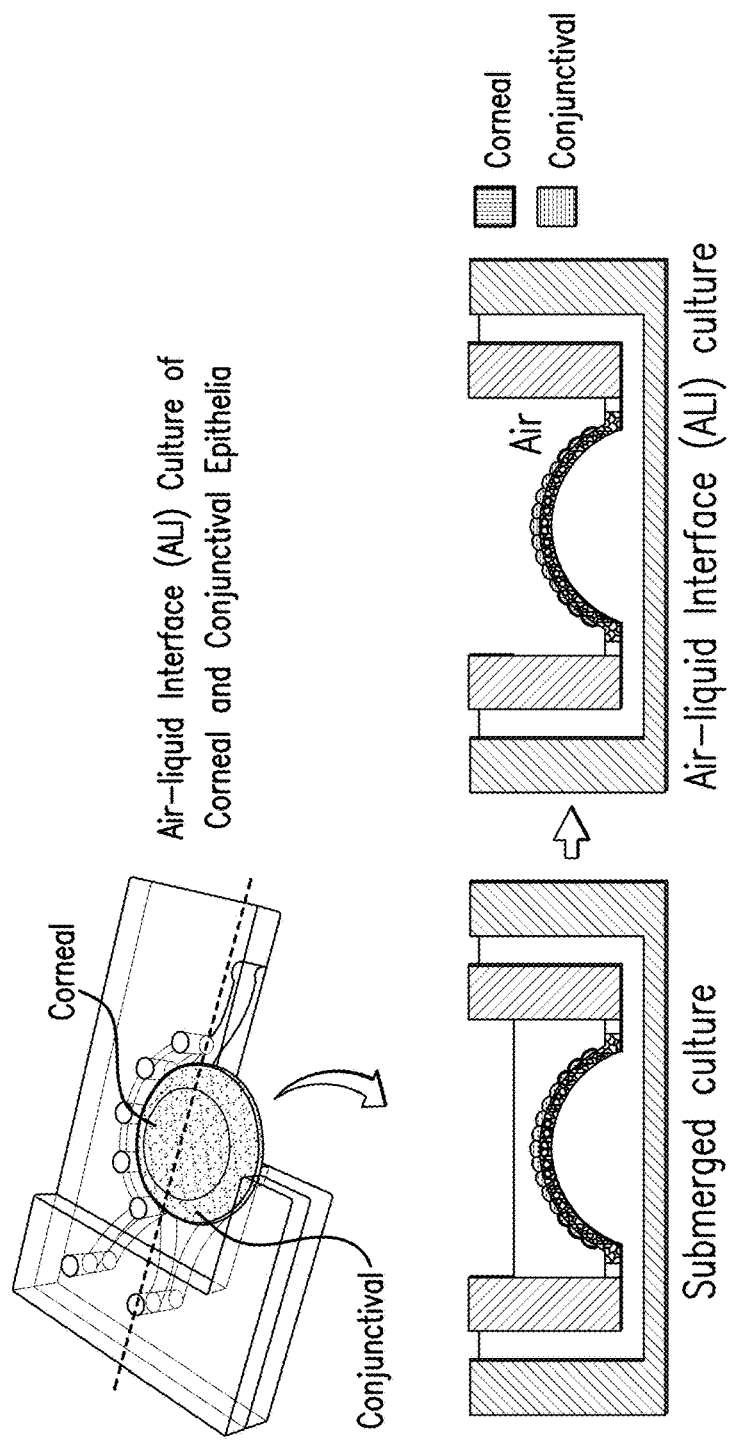

Experiments were performed to show that the human corneal epithelial cells formed stratified histological structures with 3-5 layers of epithelium (FIG. 13A) after air-liquid interface (ALI) culture for an extended period (FIG. 13G). Stratification is one of the key characteristics of differentiation of corneal epithelial cells. The human corneal epithelial cells were initially cultured submerged for three days by filling the top well with culture medium while the medium was also flowing through the lower channel. After the cells formed a fully confluent monolayer, the cells were exposed to air and cultured under ALI conditions for an additional 10 days to induce stratification. During ALI culture, the culture medium was flowing only through the lower channel to provide nutrients and oxygen to the cells in the microsystem. After a total 13 days of culture, the corneal epithelial cells were fixed in 4% paraformaldehyde (PFA), mounted in paraffin, sectioned into 8 µm-thick slices, and then stained with hematoxylin and eosin solution (H&E).

As shown in FIG. 13B, the human corneal epithelial cells in the microsystem formed tight junction structures, or occludin, which demonstrated that the cells formed a tight barrier. In addition, the human corneal cells were observed to express cytokeratin-3/12 (CK-3/12), which is the major representative marker of terminal differentiation in the corneal epithelium. In particular, as shown in FIG. 13C, the corneal epithelial cells showed significantly increased CK-3/12 expression after ALI culture.

Figure 21A:
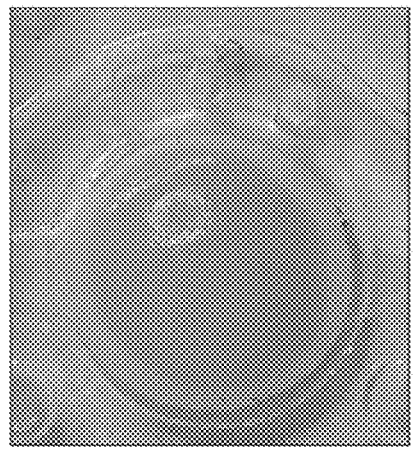
FIG. 21A-C. Images of the microengineered biomimetic eye-on-a-chip device stained with mucin.
Figure 21B:
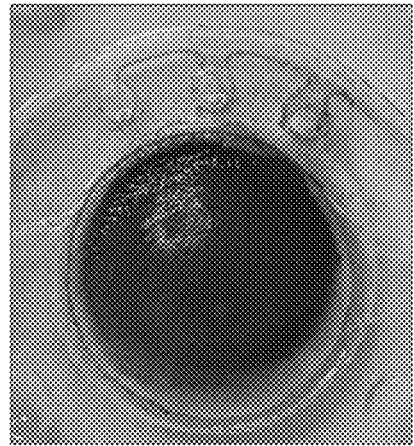
Figure 21C:
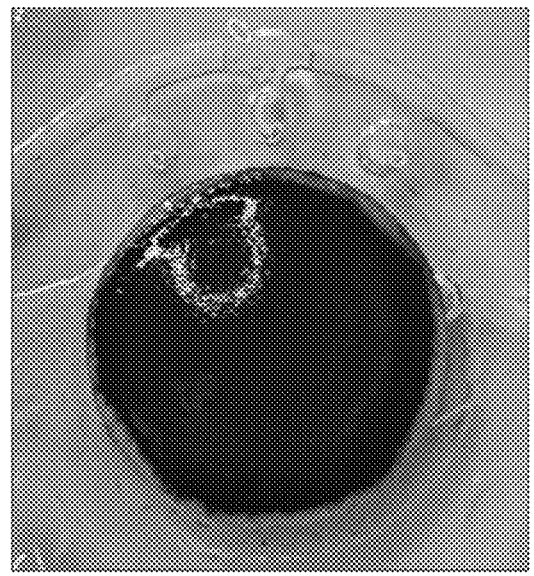

The conjunctival epithelial cells were cultured and maintained under the same conditions described above. The human conjunctival cells in the microsystem also expressed the differentiation marker CK-19. Like the corneal epithelial cells, the conjunctival epithelial cells showed significantly increased level of expression after ALI culture (FIG. 13D-E). To determine if goblet cells were formed in the conjunctival epithelial cell population, the conjunctival cells were staining with a mucin protein, MUC5AC (FIG. 13F). MUC5AC is known to be stored in mucus pockets within the goblet cells. As shown in FIG. 13F, a subset of cells within the conjunctival epithelium expressed MUC5AC, indicating that goblet cells were formed in the conjunctival epithelial cell layer. FIGS. 21A-C illustrate images of the microengineered biomimetic eye-on-a-chip device stained with mucin.

Example 4: Optical Coherence Tomography (OCT) of Biomimetic Eye Model

OCT is a non-invasive diagnostic technique for imaging the eye of human patients. It can be used to image the anterior or posterior of the eye with high resolution. Integration of the human "eye-on-a-chip" device with OCT provided additional data regarding ocular biology that can be directly compared to OCT images of human eyes.

Figure 14B:
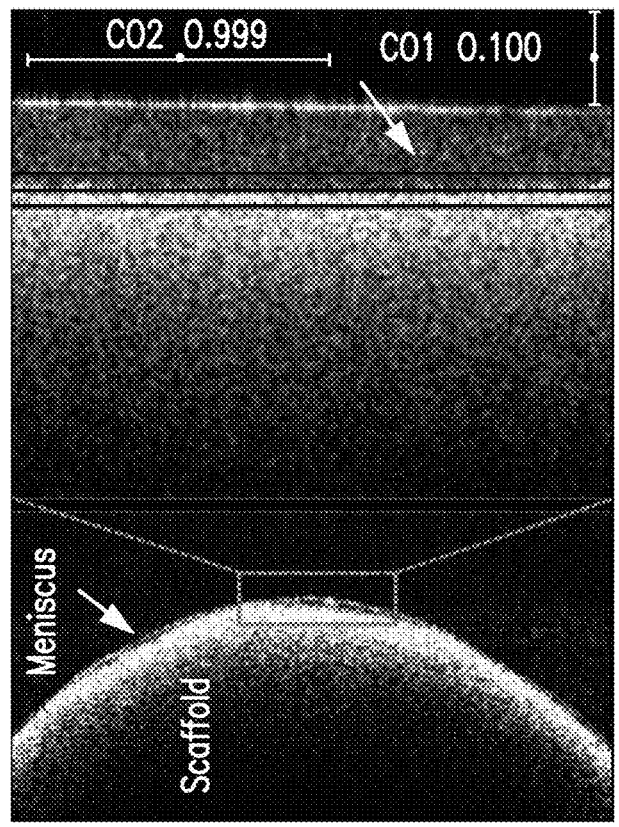
FIG. 14A-E. Analysis of the biomimetic eye model using an optical coherence tomography (OCT) device. (A) Eye-on-a-chip device mounted on small animal OCT device. (B) High resolution OCT image of eye-on-a-chip taken with small animal OCT device. (C) Eye-on-a-chip device mounted on clinical OCT device. (D) OCT image of an eye-on-a-chip taken with the clinical OCT device. (E) OCT image of a human eye taken with the clinical OCT device.
Figure 14A:
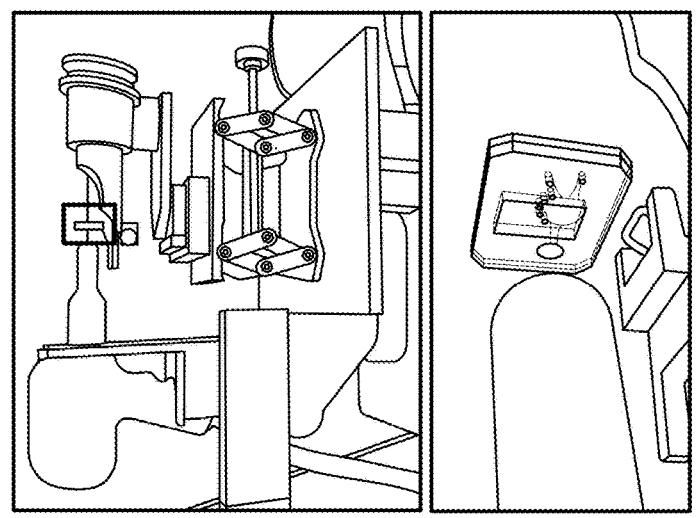
Figures 14D, 14E:
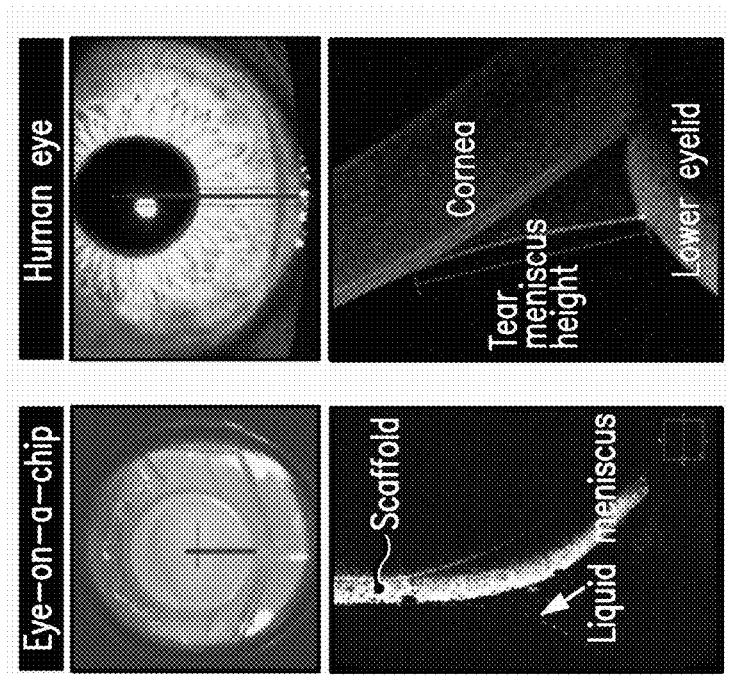
Figure 14C:
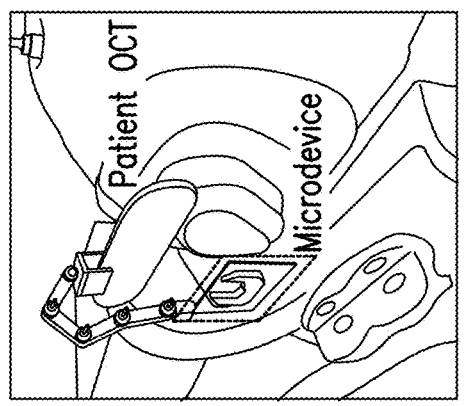

In this Example, the human "eye-on-a-chip" device was imaged by an OCT device. The device was vertically oriented and mounted to a small animal OCT device (FIG. 14A). The device captured frontal and cross-section OCT images of the scaffold, epithelial cells and liquid meniscus (FIG. 14B). The arrow in FIG. 14B indicates the liquid meniscus. Alternatively, the device can be mounted to a clinical OCT device as shown in FIG. 14C. Frontal and cross-section OCT images of the device (FIG. 14D) were compared to OCT images of tear ducts in a human eye (FIG. 14E). The OCT images of the device showed the liquid meniscus on the epithelial cells, which recapitulated the tear film of a human eye.

Example 5: Methods of Using the Blinking Eye Model to Study Dry Eye

Dry eye syndrome, also known as Keratoconjunctivitis sicca, is a common, but complex, multifactorial disease of the tears and ocular surface, resulting in symptoms such as eye discomfort, irritation and visual impairment. Dry eye syndrome is a result of insufficient eye lubrication, because of decreased tear production and/or increased tear evaporation. The disclosed eye model can be used to recapitulate dry eye to permit further research on the disease and to identify potential therapeutic agents that can alleviate the symptoms of dry eye.

Figure 15A:
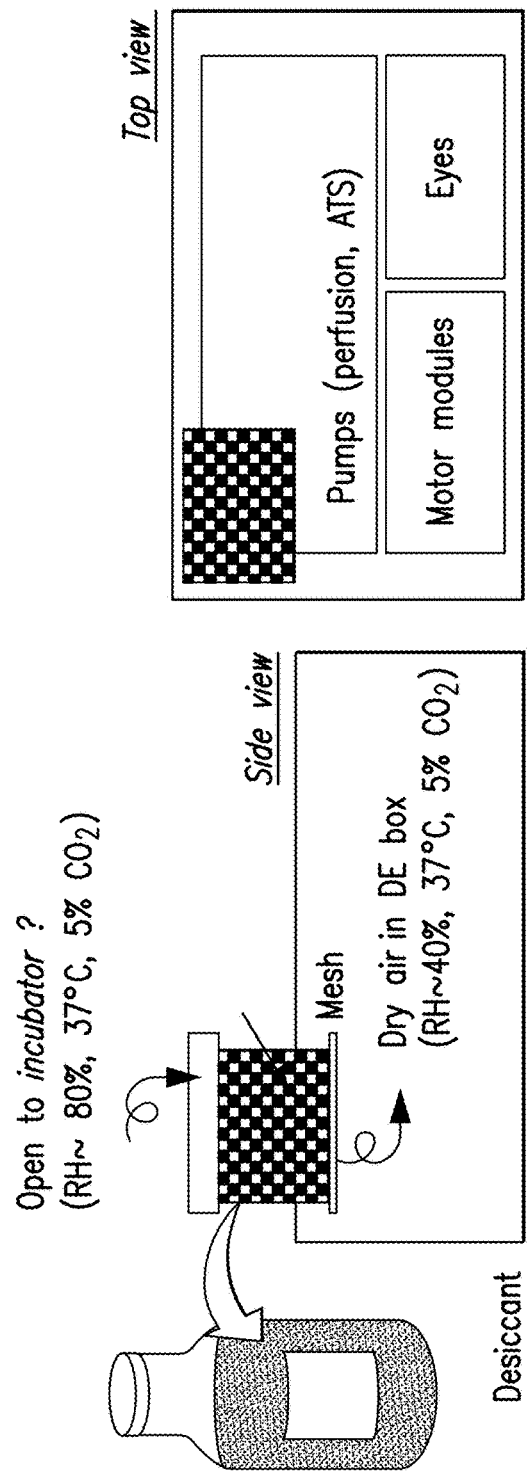
FIG. 15A-D. Dry eye model. (A) Schematic of the dry eye chamber. Humidity and temperature of the control (B) and dry eye (C) chambers. (D) Viability of cell groups tested in the dry eye chamber.
Figure 15B:
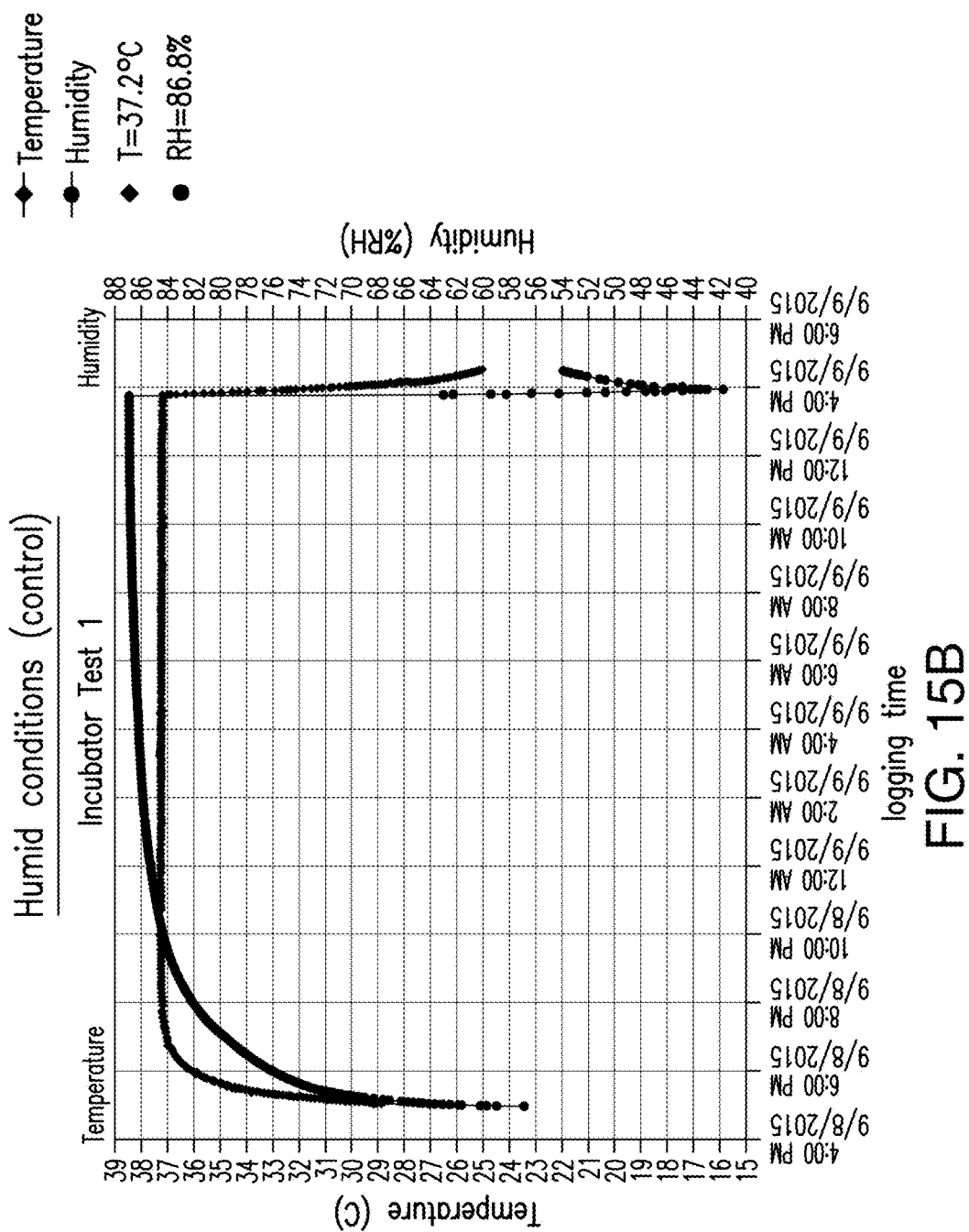
Figure 15C:
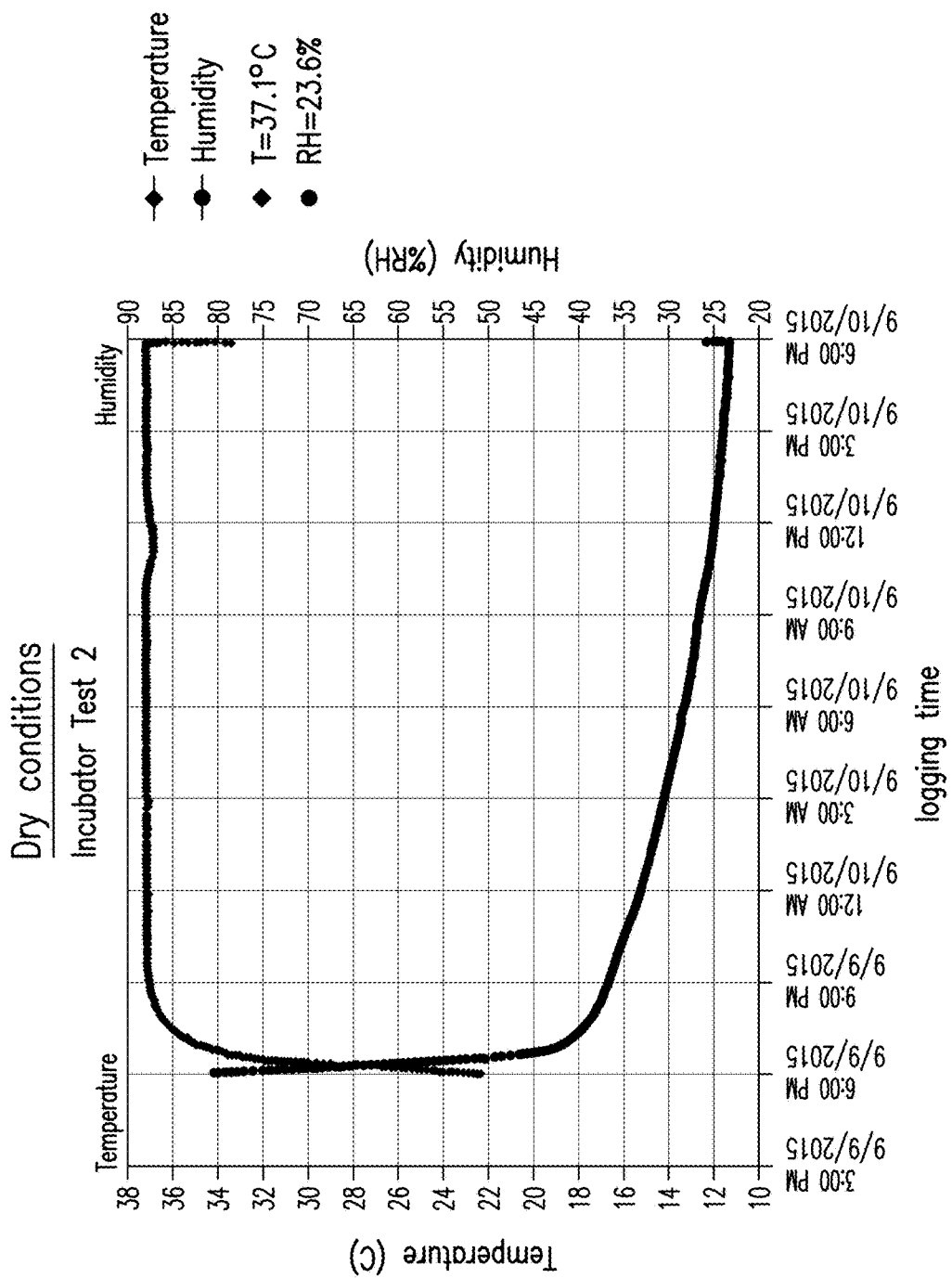

In this Example, the human "eye-on-a-chip" device was placed in a dry eye chamber having low relative humidity (FIG. 15A). The conditions of the control and dry eye chambers are shown in FIG. 15B and FIG. 15C, respectively. The flow of air into the chamber was controlled by a mesh inlet containing a desiccant. The relative humidity of the air passing through the desiccant was lowered from about 80% to about 40% before it entered the chamber. Within the chamber, the relative humidity of the air was reduced to about 23%. The temperature of the dry eye chamber was maintained at about 37° C. The effect of dry conditions on cell viability was measured using a viability assay.

Figure 15D:
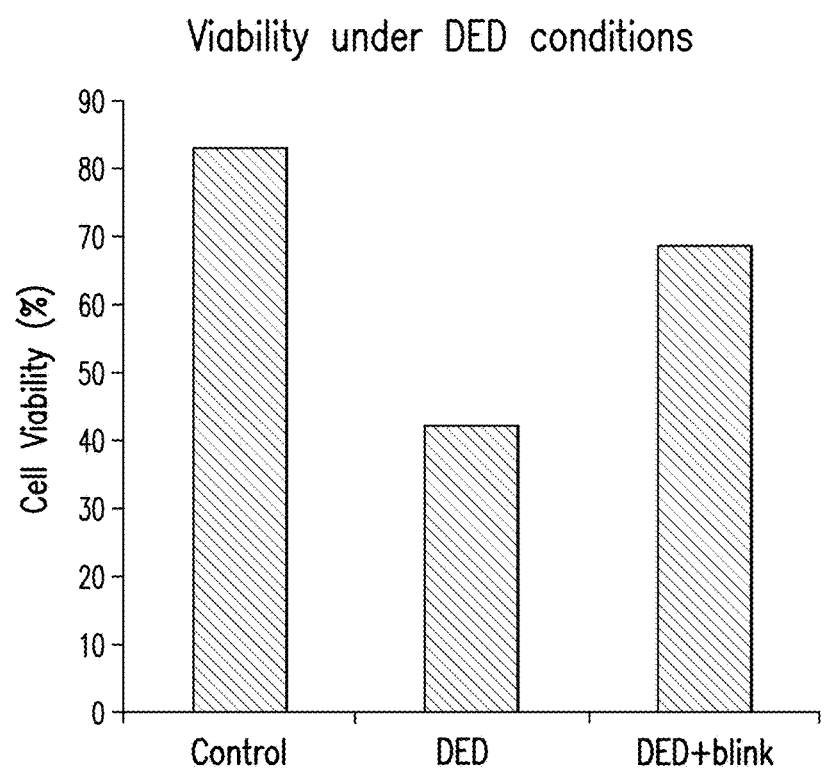

For a first cell group (the "DED" group), the device was removed from the medium and exposed to air in the dry eye chamber for one hour without blinking. For a second cell group (the "DED+blink" group), the device was removed from the medium and exposed to air in the dry eye chamber for one hour with frequent blinking. A control cell group was immersed in medium for one hour. FIG. 15D compares the cell viability of the three cell groups. Although the control group exhibited the greatest viability, the DED+blink group exhibited greater viability than the DED group, likely due to frequent hydration by blinking. These results show that the disclosed biomimetic eye model can be used to study dry eye syndrome. FIGS. 22A-F illustrate optical and fluorescence microscope images of the microengineered biomimetic eye-on-a-chip under blinking actuation. FIGS. 26A-E results of MMP-9 released from a normal eye and DED sample.

Figure 16:
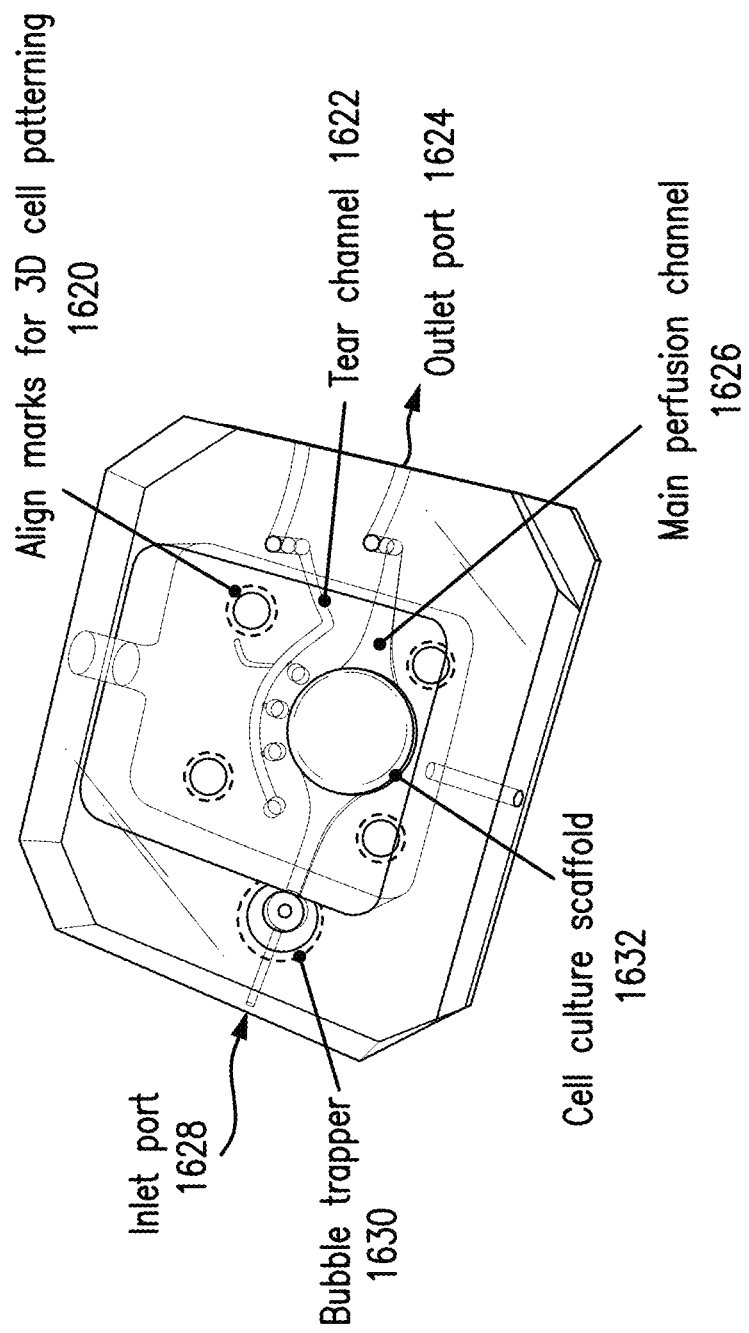
FIG. 16. Photograph of the disclosed microengineered biomimetic eye-on-a-chip device.

Example 6: Experimental Data Collected from Microengineered Biomimetic Eye-on-a-Chip Device FIG. 16 illustrates a photograph of the disclosed "eye-on-a-chip" device. The device can include a main perfusion channel 1626 and align marks 1620 for 3D cell patterning as described above with relation to FIGS. 6A-F and FIGS. 7A-B. The device can include tear secretion channels such as tear channel 1622, and one or more microfabricated openings, such as output port 1624 and inlet port 1628, which can be interconnected by the tear secretion channel 1622 through which tear simulants are introduced. The device can also include a cell culture scaffold 1632 and a bubble trapper 1630.

Figure 17A:
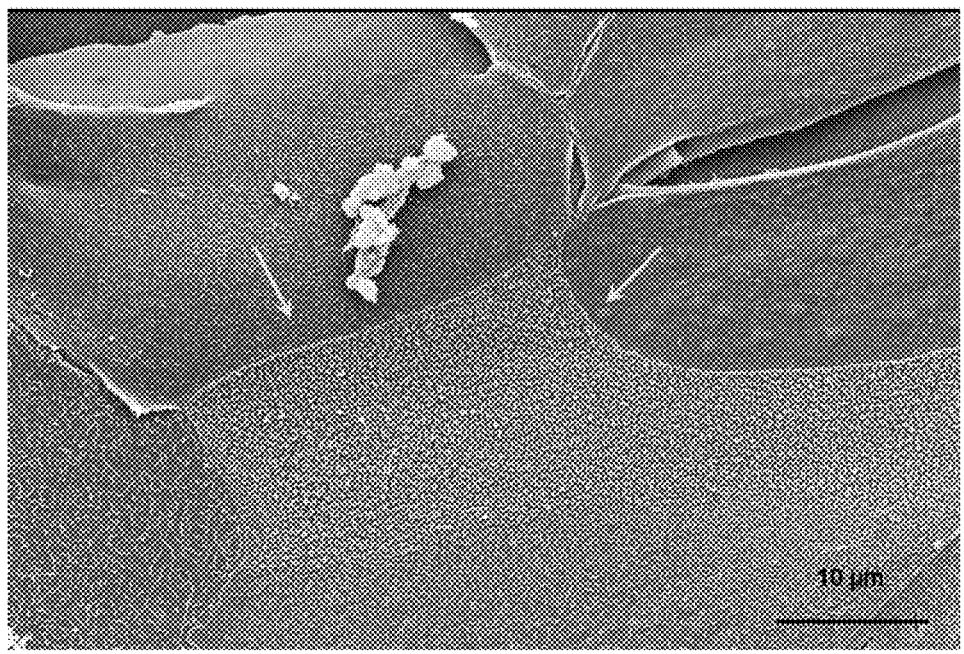
FIG. 17A-B. High resolution microscopy images of human corneal epithelial cells cultured for 21 days.
Figure 17B:
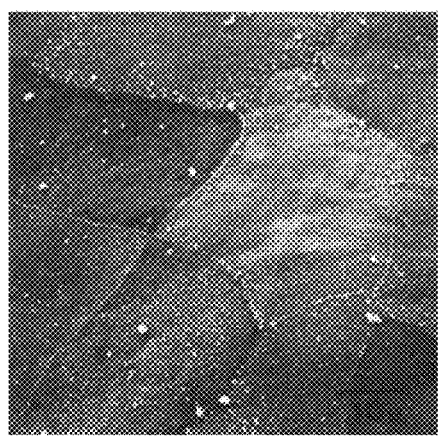
Figure 18A:
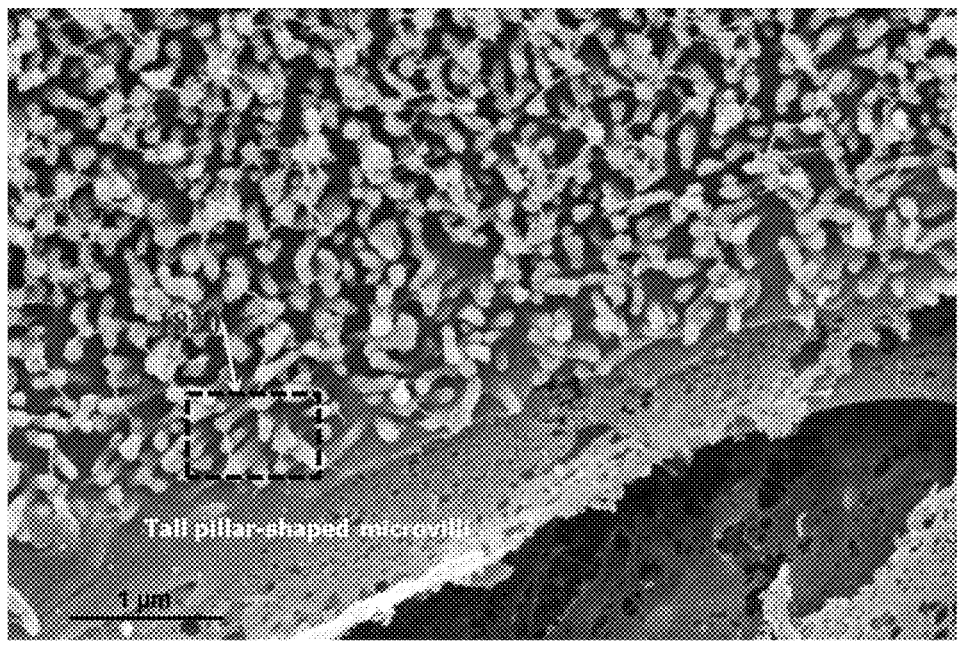
FIG. 18A-C. High resolution microscopy images of microvilli formation on the surface of human corneal epithelial cells.
Figure 18B:
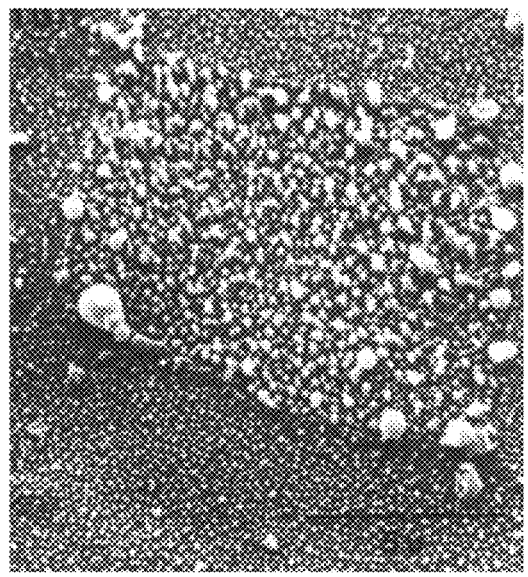
Figure 18C:
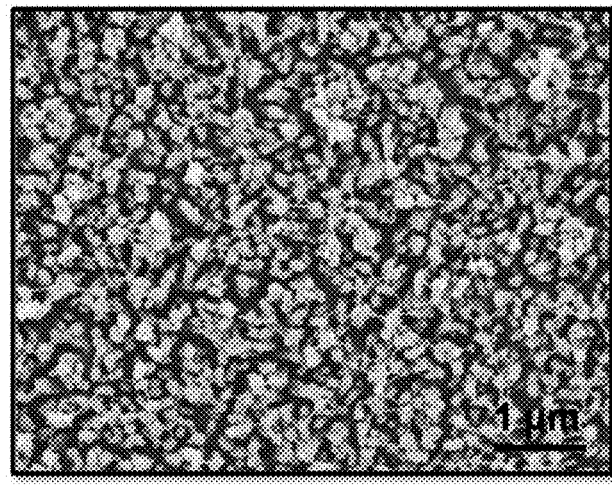
Figure 19A:
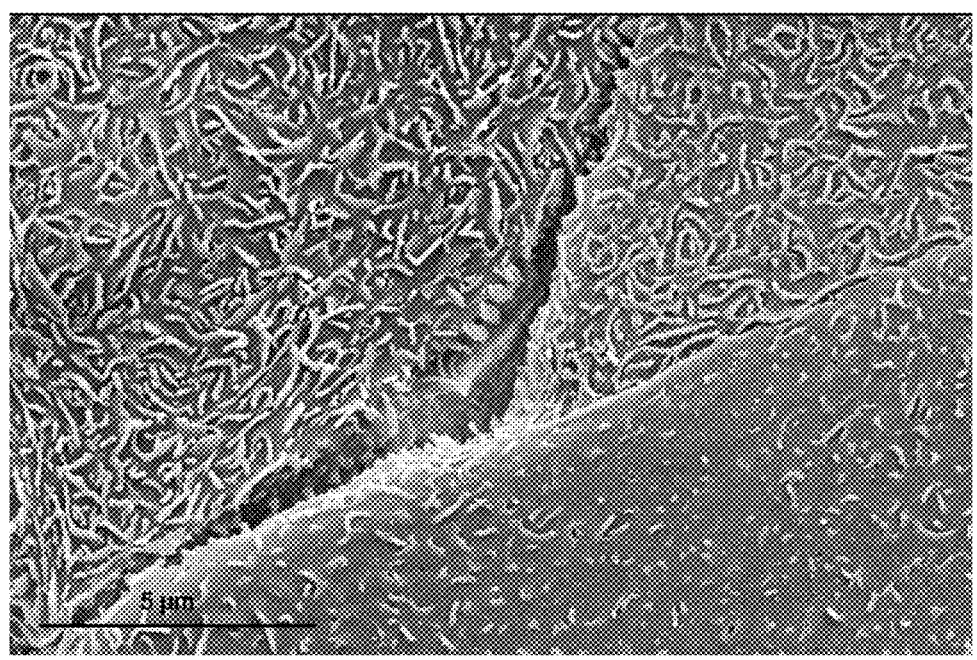
FIG. 19A-C. High resolution microscopy images of microplicae formation on the surface of human corneal epithelial cells.
Figure 19B:
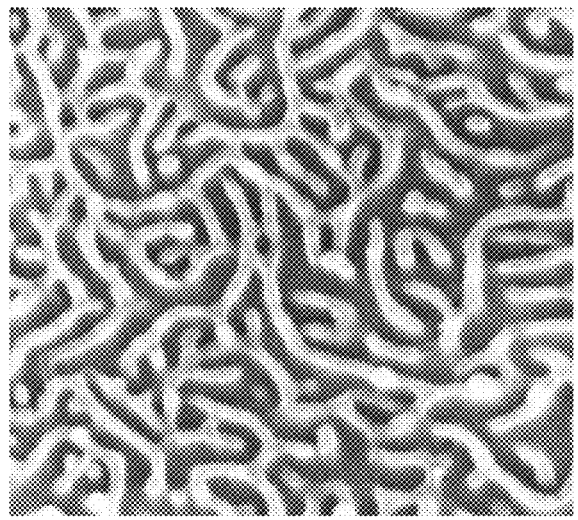
Figure 19C:
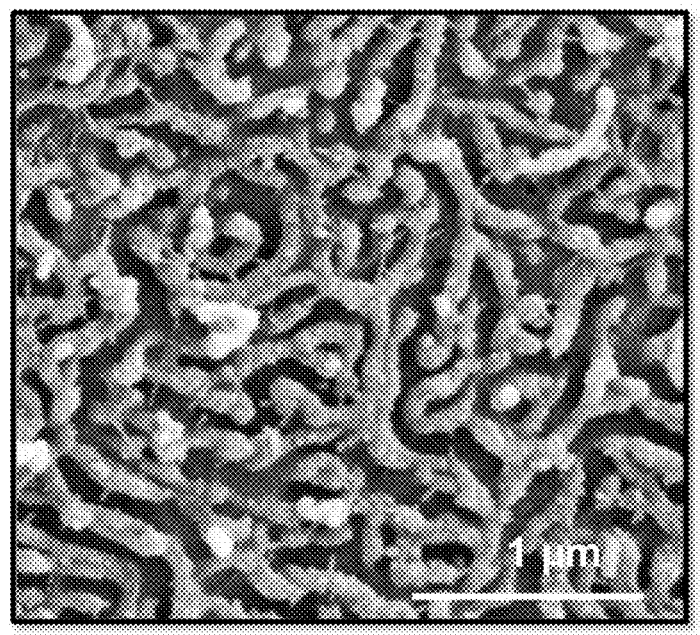

FIG. 17A illustrates high resolution microscopy images of human corneal epithelial cells cultured for 21 days. FIG. 17B illustrates an enlarged view of a portion of the image of FIG. 17A. FIGS. 17A-B illustrate the flattened morphology of the human corneal epithelial cells. FIG. 18A illustrates a high resolution microscopy image of microvilli formation on the surface of human corneal epithelial cells. FIG. 18A illustrates tall pillar-shaped microvilli that can form on the surface of the corneal epithelial cells. FIGS. 18B and 18C illustrate enlarged views of different portions of the image of FIG. 18A. FIG. 19A illustrates a high resolution microscopy image of microplicae formation on the surface of human corneal epithelial cells. FIGS. 19B and 19C illustrate enlarged views of different portions of the image of FIG. 18A.

Figure 20A:
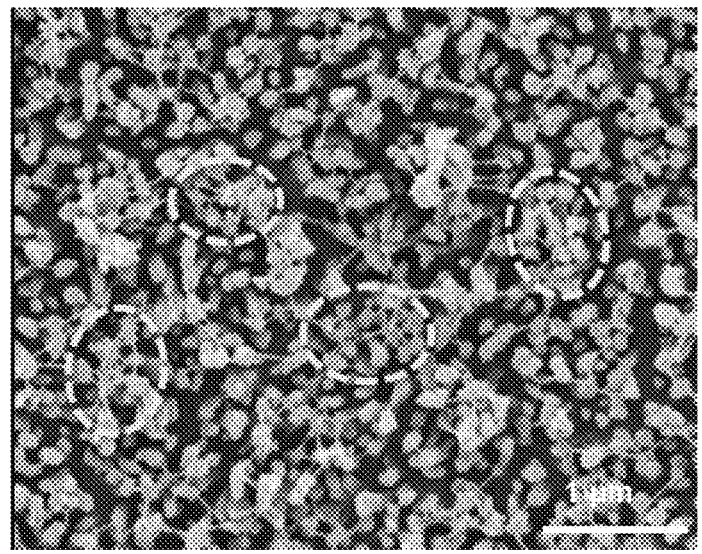
FIG. 20A-D. High resolution microscopy images of microvilli and microplicae formations on the surface of the corneal epithelial cells in the microengineered biomimetic eye-on-a-chip device.
Figure 20B:
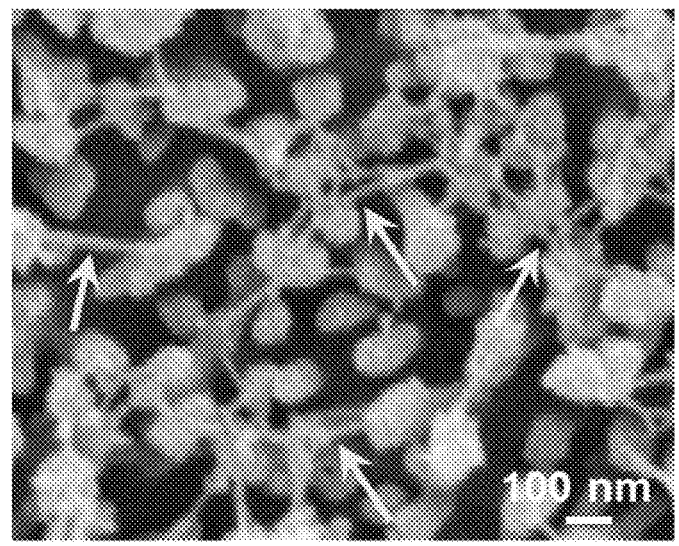
Figure 20C:
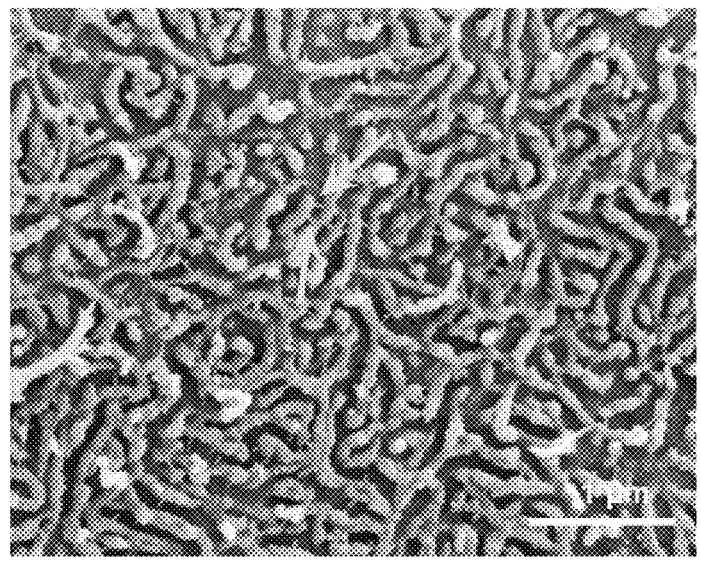
Figure 20D:
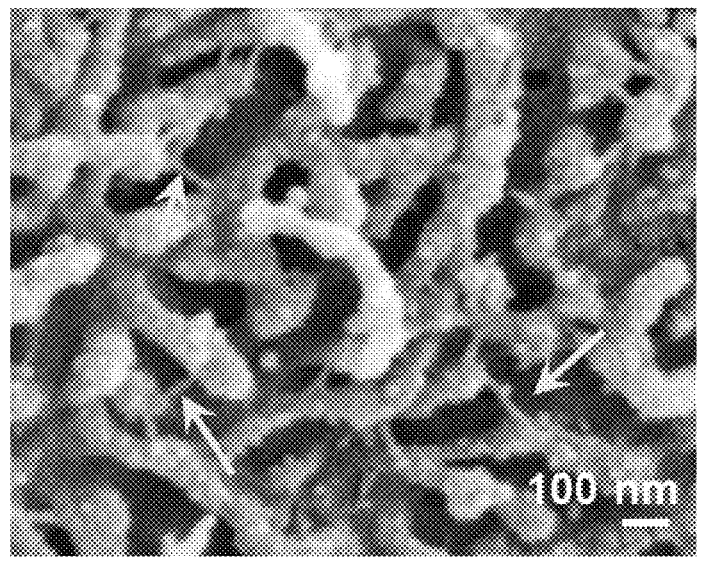

FIGS. 20A-D illustrate high resolution microscopy images of microvilli and microplicae formations on the surface of the corneal epithelial cells in the microengineered biomimetic eye-on-a-chip device that have been stained with mucin (e.g., glycocalyx). FIG. 20A illustrates microvilli formed on the surface of the corneal epithelial cells in the microengineered biomimetic eye-on-a-chip device. FIG. 20B illustrates an enlarged view of a portion of FIG. 20A. FIG. 20C illustrates microplicae formed on the surface of the corneal epithelial cells in the microengineered biomimetic eye-on-a-chip device. FIG. 20D illustrates an enlarged view of a portion of FIG. 20C.

FIGS. 21A-C illustrate images of the microengineered biomimetic eye-on-a-chip device stained with mucin. The device can be stained with an alcian blue (AB) and a periodic acid-Schiff (PAS) staining technique. AB mucins can be acidic only and PAS mucins can be a combination of acidic and neutral mucins. FIG. 21A illustrates the device at an initial stage being empty. FIG. 21B illustrates the device at 3 days into the culture prior to the air-liquid interface (ALI) culture. FIG. 21C illustrates the device after ALI culture at a period of 21 days into the culture. As illustrated by FIGS. 21A-C, after long term culture, more mucin was secreted from the epithelial cell surfaces of the microengineered biomimetic eye-on-a-chip device.

Figure 22A:
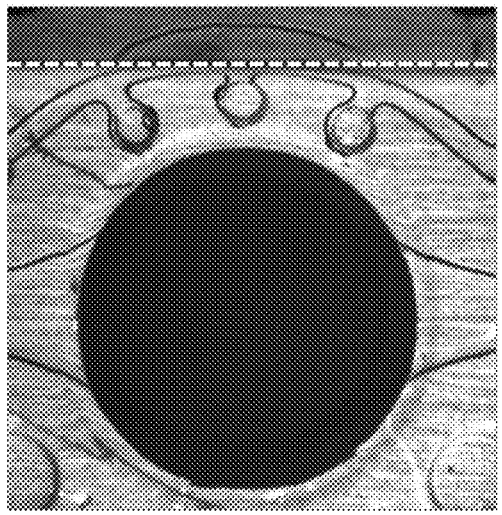
FIG. 22A-F. Optical and fluorescence microscope images of the microengineered biomimetic eye-on-a-chip device under blinking actuation.
Figure 22B:
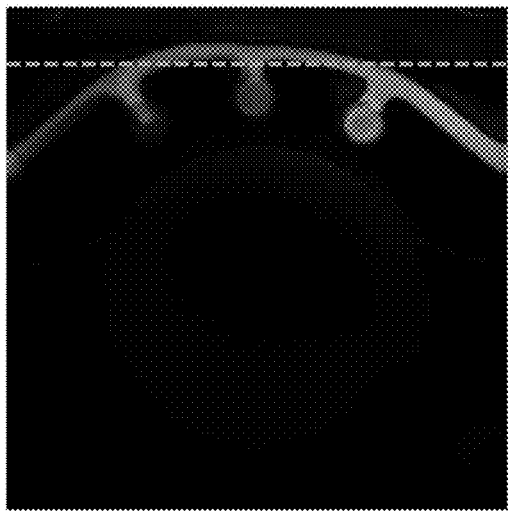
Figure 22C:
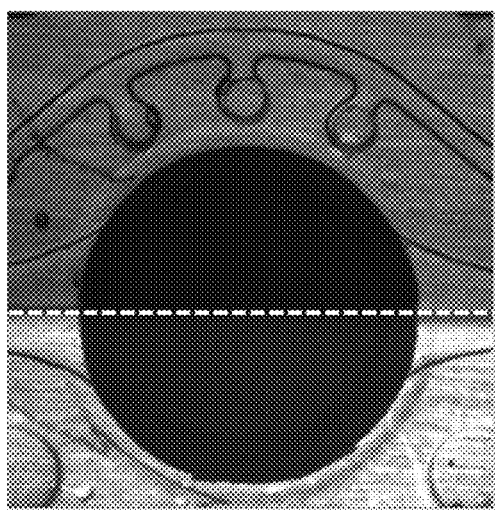
Figure 22D:
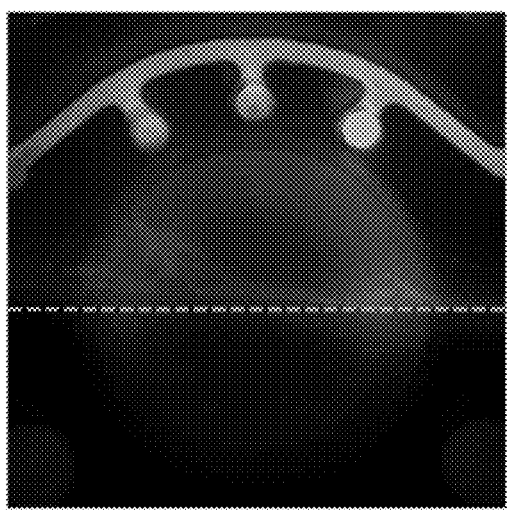
Figure 22E:
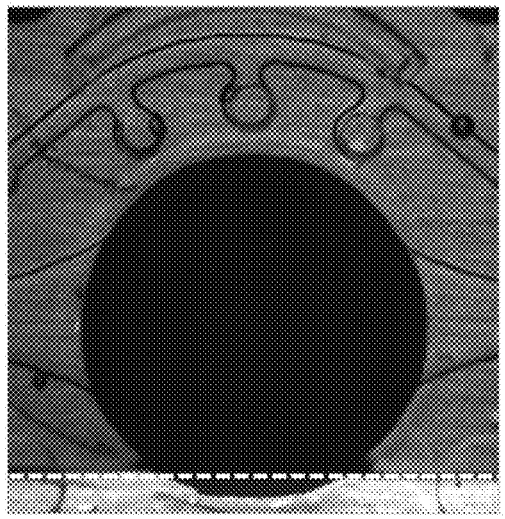
Figure 22F:
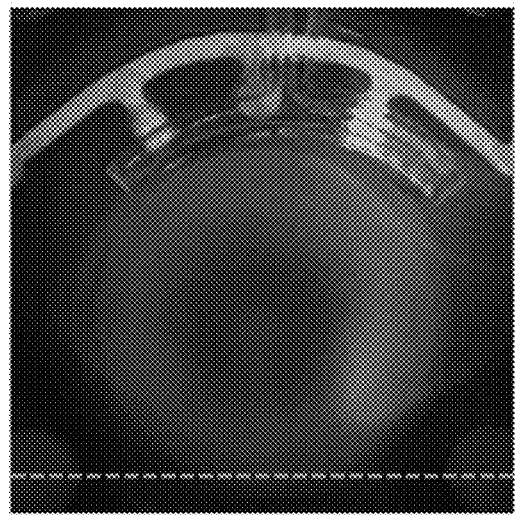

FIGS. 22A-F illustrate optical and fluorescence microscope images of the microengineered biomimetic eye-on-a-chip under blinking actuation. FIGS. 22A and 22B illustrate an optical microscope image and a fluorescence microscopy image, respectively, of the device when the fabricated biomimetic hydrogel eyelid is open. FIGS. 22C and 22D illustrate an optical microscope image and a fluorescence microscopy image, respectively, of the device when the fabricated biomimetic hydrogel eyelid is partially open. FIGS. 22E and 22F illustrate an optical microscope image and a fluorescence microscopy image, respectively, of the device when the fabricated biomimetic hydrogel eyelid is closed.

Figure 23A:
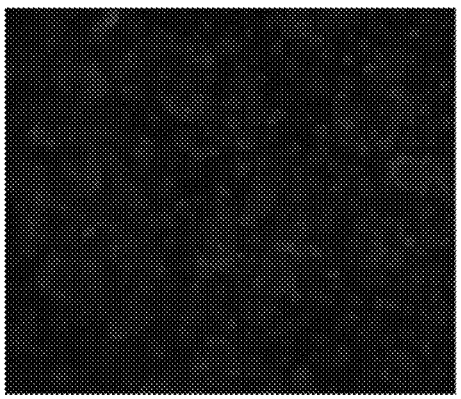
FIG. 23A-C. Cytokeratin expression under blinking actuation in the microengineered biomimetic eye-on-a-chip device. (A) Cytokeratin expression of epithelial cells exposed to ALI. (B) Cytokeratin expression of epithelial cells exposed to ALI exposed to mechanical stimulation of blinking actuation. (C) Graph comparing cytokeratin expression in epithelial cells that were subject to mechanical stimulation vs. epithelial cells not subjected to mechanical stimulation.
Figure 23B:
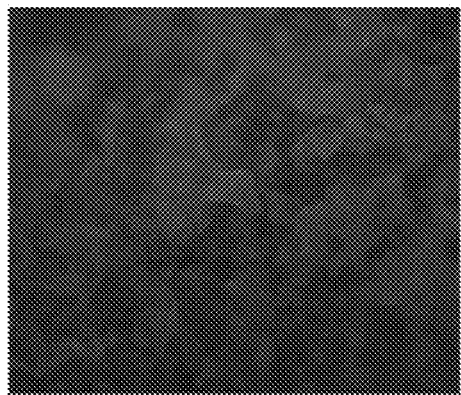
Figure 23C:
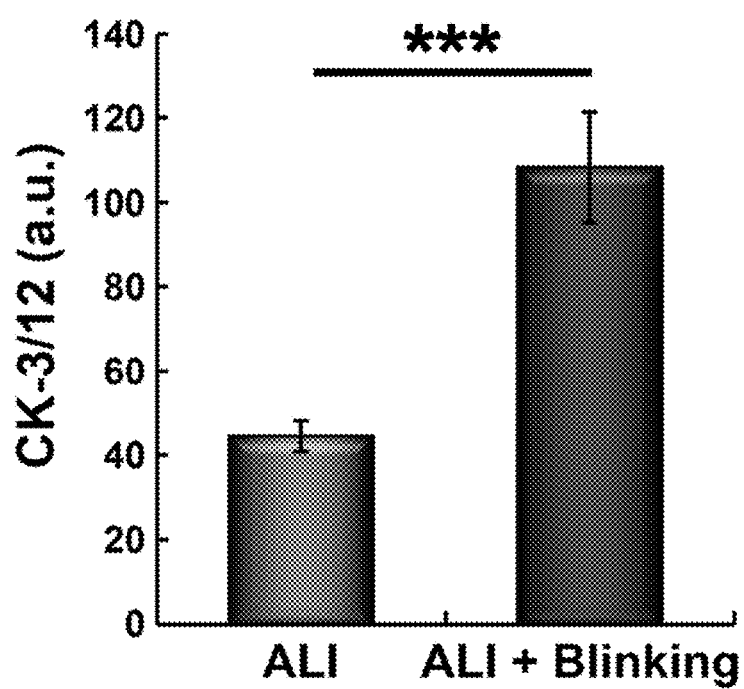

FIGS. 23A-C illustrate cytokeratin expression under blinking actuation in the microengineered biomimetic eye-on-a-chip device. FIG. 23A illustrates cytokeratin expression of epithelial cells exposed to ALI without any mechanical stimulation. FIG. 23B cytokeratin expression of epithelial cells exposed to ALI exposed to mechanical stimulation of blinking actuation. Cells were exposed to mechanical stimulation on the sixth and seventh day of the ALI culture for 48 hours. Expression of cytokeratin-3/12 (CK-3/12) in the corneal epithelial cells was evaluated. FIG. 23C illustrates a graph comparing cytokeratin expression in epithelial cells that were subject to mechanical stimulation vs. epithelial cells not subjected to mechanical stimulation. As illustrated by the graph of FIG. 23C, significantly higher level of CK-3/12 were observed in the stimulated group.

FIG. 24A-C illustrate high resolution OCT images of the tear film in the microengineered biomimetic eye-on-a-chip device. FIG. 24B illustrates an enlarged view of a portion of FIG. 24A. FIG. 24C illustrates an enlarged view of a portion of FIG. 24B. As illustrated by FIGS. 24A-C, tear film thickness in the biomimetic device is about 15 µm thick, which approximates the thickness of the tear film in the human eye (e.g., having a thickness of approximately 10 µm).

Figure 25A:
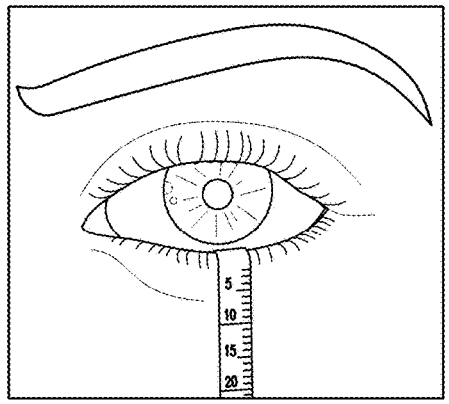
FIG. 25A-D. Schirmer's test to measure tear volume. (A) Illustration of Schirmer's test. (B) Image of Schirmer's test performed on the microengineered biomimetic eye-on-a-chip device. (C) Result of performing Schirmer's test on a normal human eye. (D) Result of performing Schirmer's test on microengineered biomimetic eye-on-a-chip device.
Figure 25B:
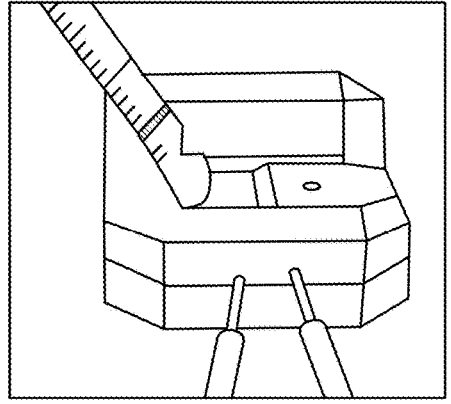
Figure 25C:
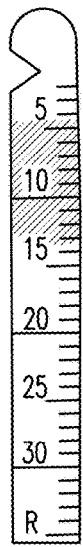
Figure 25D:
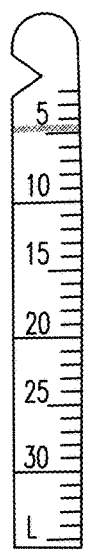

FIG. 25A illustrates a diagram of Schirmer's test, which can be used to determine whether the eye produces enough tears to keep it moist. Schirmer's test can be performed when a person experiences very dry eyes or excessive watering of the eyes. The test can be performed by placing a small strip of filter paper inside the lower eyelid (e.g., inferior fornix). The eyes are closed for 5 minutes. The filter paper is then removed and the amount of moisture is measured. FIG. 25B illustrates an image of the test apparatus used to perform Schirmer's test perform on the microengineered biomimetic eye-on-a-chip device. FIG. 25C illustrates the result of performing Schirmer's test on a normal human eye. A negative (more than 10 mm of moisture on the filter paper after 5 minutes of performing the test) test result is normal for a normal human eye. FIG. 25D illustrates the result of performing Schirmer's test on the DED group using the microengineered biomimetic eye-on-a-chip device, which yields a result of 3-5 mm on the filter paper after performing the test.

FIGS. 26A-D illustrate fluoroscopy images of MMP-9 released from a normal eye and DED sample. MMP-9 is a cytokine produced by epithelial cells experiencing inflammation that appears to be a reliable marker for the presence of early ocular surface disease and dry eye. After maintaining DED conditions for 48 hours (e.g., shown in FIG. 26B), tear fluid was collected using glass microcapillary tube (e.g., 20 µL). The MMP-9 level in the collected tear from the DED sample (e.g., FIG. 26D) was analyzed with the MMP-9 ELISA assay. The same process was performed with a normal eye (e.g., FIGS. 26A and 26C) for comparison.

Figure 26A:
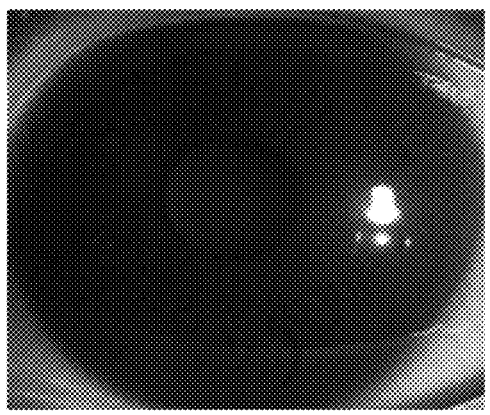
FIG. 26A-E. (A-D) Flouroscopy images of MMP-9 released from a normal eye and DED sample. (E) Graph comparing MMP-9 released from a normal eye and DED sample.
Figure 26B:
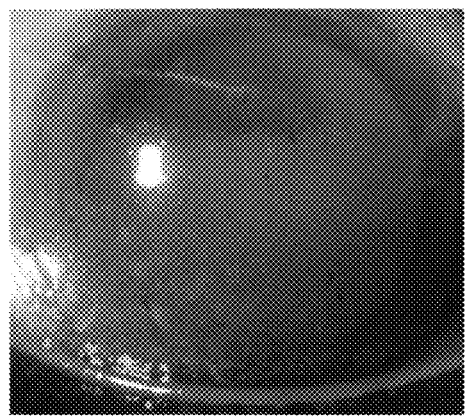
Figure 26C:
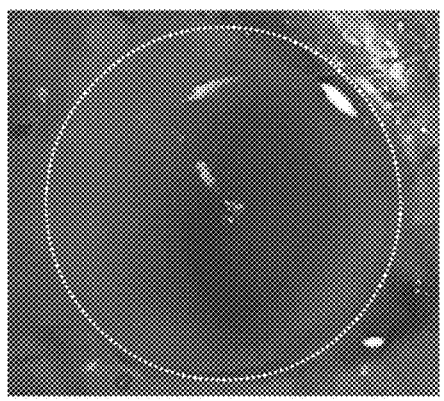
Figure 26D:
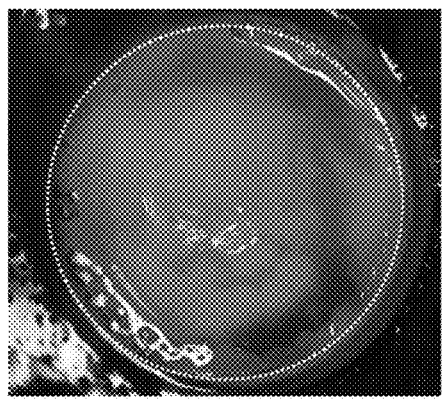
Figure 26E:
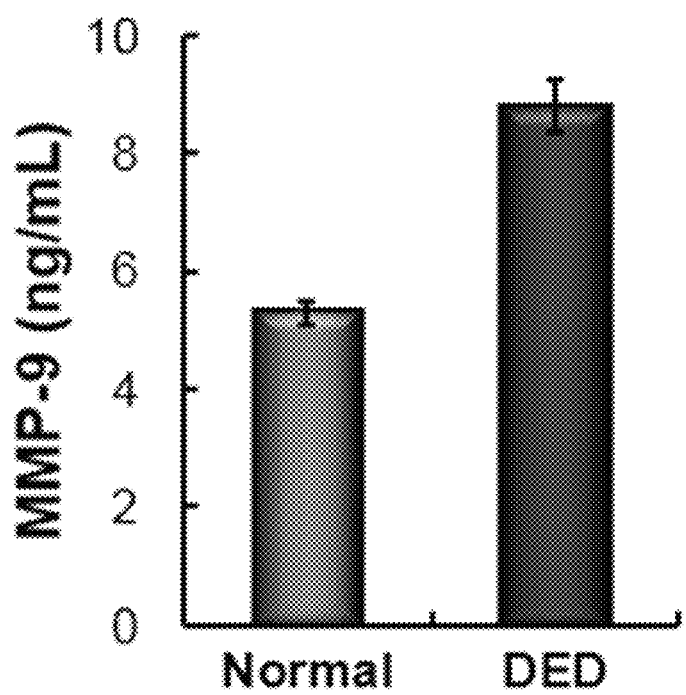

FIG. 26E illustrates a graph comparing MMP-9 released from a normal eye and the DED sample. As illustrated by the graph of FIG. 26E, significantly higher level of MMP-9 was detected in the DED group compared to the normal eye sample.

The present disclosure is well adapted to attain the ends and advantages mentioned as well as those that are inherent therein. The particular embodiments disclosed above are illustrative only, as the present disclosure can be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above can be altered or modified and all such variations are considered within the scope and spirit of the present disclosure. Various publications, patents and patent application are cited herein, the contents of which are hereby incorporated by reference in their entireties.

The invention claimed is:

1. A method for producing a biomimetic eye model, comprising:
   (a) providing a scaffold comprising a surface;
   (b) coupling the scaffold to a fluidic device;
   (c) impregnating the scaffold with one or more keratocytes; and
   (d) adhering corneal and conjunctival epithelial cells to said surface.

2. The method of claim 1, wherein after step (d), said surface comprises a circular pattern of adhered conjunctival epithelial cells surrounding the adhered corneal epithelial cells.

3. The method of claim 1, wherein said surface comprises a convex curvature of the scaffold.

4. The method of claim 1, further comprising coupling a fabricated eyelid to the fluidic device.

5. The method of claim 3, wherein impregnating the scaffold with keratocytes comprises depositing a cell suspension comprising one or more keratocytes and an extracellular matrix (ECM) to the convex curvature of the scaffold.

6. The method of claim 5, wherein the ECM comprises a hydrogel.

7. The method of claim 3, wherein the adhesion of corneal and conjunctival epithelial cells is to the convex curvature of the scaffold.

8. The method of claim 4, further comprising coupling a motor to the fabricated eyelid.

\* \* \* \* \*

UNITED STATES PATENT AND TRADEMARK OFFICE
CERTIFICATE OF CORRECTION

PATENT NO. : 10,360,819 B2
APPLICATION NO. : 15/495619
DATED : July 23, 2019
INVENTOR(S) : Dongeun Huh et al.

Page 1 of 1

It is certified that error appears in the above-identified patent and that said Letters Patent is hereby corrected as shown below:

On the Title Page

At item (72) Inventors please add:
"Mina Massaro-Giordano, Radnor, PA (US);
Vatinee Bunya, Penn Valley, PA (US)"

Signed and Sealed this
Sixth Day of October, 2020

Andrei Iancu
*Director of the United States Patent and Trademark Office*